US012749438B2

(12) United States Patent
Park et al.

(10) Patent No.: US 12,749,438 B2
(45) Date of Patent: Sep. 29, 2026

(54) DISPLAY DEVICE AND IMAGE DISPLAY DEVICE INCLUDING SAME

(71) Applicant: LG ELECTRONICS INC., Seoul (KR)

(72) Inventors: Byunghun Park, Seoul (KR); Sunghwan Kim, Seoul (KR); Hongkyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/128,146

(22) PCT Filed: Nov. 10, 2022

(86) PCT No.: PCT/KR2022/017660
§ 371 (c)(1),
(2) Date: May 7, 2025

(87) PCT Pub. No.: WO2024/101479
PCT Pub. Date: May 16, 2024

(65) Prior Publication Data
US 2026/0196160 A1 Jul. 9, 2026

(51) Int. Cl.
*G09G 3/32* (2016.01)
*G06F 3/03* (2006.01)
*G06F 3/033* (2013.01)

(52) U.S. Cl.
CPC ............ *G09G 3/32* (2013.01); *G06F 3/0304* (2013.01); *G06F 3/033* (2013.01);
(Continued)

(58) Field of Classification Search
CPC .. G09G 3/32; G09G 2310/08; G09G 2354/00; G09G 2360/14; G06F 3/0304; G06F 3/033
See application file for complete search history.

(56) References Cited

U.S. PATENT DOCUMENTS 9,183,779 B2 * 11/2015 Soto ...................... H05B 47/11
2006/0086896 A1 4/2006 Han
(Continued)

FOREIGN PATENT DOCUMENTS

KR 1020070020431 2/2007
KR 10-2012-0049903 A 5/2012
(Continued)

OTHER PUBLICATIONS

PCT International Application No. PCT/KR2022/017660, International Search Report dated Aug. 9, 2023, 4 pages.
(Continued)

*Primary Examiner* — Rodney Amadiz
(74) *Attorney, Agent, or Firm* — LEE, HONG, DEGERMAN, KANG & WAIMEY

(57) ABSTRACT

A display device and an image display apparatus including the same are disclosed. The display device includes: light emitting diodes; first switching drivers to supply scan signal or voltage of first level to anodes of the light emitting diodes for first line during display mode period; second switching drivers to supply voltage of second level less than the first level to cathodes of the light emitting diodes for second line during the display mode period; a first switch to output and not output the scan signal or the voltage of the first level during the display mode period and a sensing mode period, respectively; a second switch to output current flowing based on pointer light during the sensing mode period; and an amplifier to amplify difference between first and second line voltage based on the current. Accordingly, the pointer light can be stably sensed without a separate optical sensor.

20 Claims, 25 Drawing Sheets

180a

(52) U.S. Cl.
CPC ..... *G09G 2310/08* (2013.01); *G09G 2354/00* (2013.01); *G09G 2360/14* (2013.01)

(56) References Cited

U.S. PATENT DOCUMENTS

| | | | | |
|---|---|---|---|---|
| 2011/0316771 | A1* | 12/2011 | Kume | G06F 3/0412 345/156 |
| 2014/0145997 | A1* | 5/2014 | Tiruvuru | G06F 3/041662 345/174 |
| 2015/0348504 | A1 | 12/2015 | Sakariya et al. | |
| 2020/0258448 | A1 | 8/2020 | Hargreaves | |
| 2025/0013317 | A1* | 1/2025 | Jung | G09G 3/32 |

FOREIGN PATENT DOCUMENTS

| | | |
|---|---|---|
| KR | 101425461 | 7/2014 |
| KR | 101535894 | 7/2015 |
| KR | 102300405 | 9/2021 |

OTHER PUBLICATIONS

Korean Intellectual Property Office Application No. 10-2025-7018167, Office Action dated Aug. 11, 2026, 7 pages.

* cited by examiner

DISPLAY DEVICE AND IMAGE DISPLAY DEVICE INCLUDING SAME

CROSS-REFERENCE TO RELATED APPLICATION(S)

This application is the National Stage filing under 35 U.S.C. 371 of International Application No. PCT/KR2022/017660, filed on Nov. 10, 2022, the contents of which are all incorporated by reference herein in its entirety.

BACKGROUND

1. Field

The present disclosure relates to a display device and an image display apparatus including the same, and more particularly to a display device capable of stably sensing a pointer light without a separate optical sensor, and an image display apparatus including the same.

2. Description of the Related Art

An image display apparatus is an apparatus that displays an image, and can include various types of display devices for image display.

Recently, light emitting diodes are increasingly used in consideration of color reproduction and luminance of the display apparatus and the like.

Meanwhile, the display apparatus including the light emitting diodes has a drawback in that a separate optical sensor is required in order to sense an external pointer light, thereby resulting in a complicated panel in the display apparatus.

SUMMARY

It is an objective of the present disclosure to provide a display device capable of stably sensing a pointer light, and an image display apparatus including the same.

It is another objective of the present disclosure to provide a display device capable of stably sensing a pointer light without a separate optical sensor, and an image display apparatus including the same.

In order to achieve the above and other objectives, a display device and an image display apparatus including the same according to an embodiment of the present disclosure include: a plurality of light emitting diodes arranged in a matrix form; a plurality of first switching drivers configured to supply a scan signal or a voltage of a first level to anodes of the plurality of light emitting diodes for each first line based on a switching operation during a display mode period; a plurality of second switching drivers configured to supply a voltage of a second level less than the first level to cathodes of the plurality of light emitting diodes for each second line based on the switching operation during the display mode period; a first switch configured to output the scan signal or the voltage of the first level during the display mode period and not output the scan signal or the voltage of the first level during a sensing mode period separate from the display mode period; a second switch configured to output the voltage of the second level during the display mode period and output a current flowing in at least one of the plurality of light emitting diodes based on a pointer light during the sensing mode period; and an amplifier configured to amplify a difference between a first line voltage and a second line voltage based on the current flowing in the light emitting diode during the sensing mode period.

Meanwhile, a current in a first direction can flow in at least some of the plurality of light emitting diodes during the display mode period, and a current in a second direction, opposite to the first direction, can flow in at least some of the plurality of light emitting diodes during the sensing mode period.

Meanwhile, in response to a difference between the voltage of the first level and the voltage of the second level, the current in the first direction can flow in at least some of the plurality of light emitting diodes during the display mode period and the current in the second direction opposite to the first direction can flow in at least some of the plurality of light emitting diodes during the sensing mode period.

Meanwhile, an anode voltage of the light emitting diode, on which the pointer light is incident, is less in the sensing mode period than in the display mode period, and a cathode voltage of the light emitting diode, on which the pointer light is incident, is greater in the sensing mode period than in the display mode period.

Meanwhile, the display device can further include: a first driver configured to output the scan signal or the voltage of the first level to the plurality of first switching drivers; and a second driver configured to output the voltage of the second level to the plurality of second switching drivers.

Meanwhile, the display device can further include: a sensing controller configured to control a switching operation of the first switch and the second switch during the sensing mode period; and a sensing interface configured to supply a signal, output through the amplifier, to a timing controller.

Meanwhile, the sensing controller can be configured to sequentially drive the plurality of first switching drivers and the plurality of second switching drivers during the sensing mode period, wherein the sensing interface can be configured to output coordinate information of the pointer light based on sequential driving of the plurality of first switching drivers and the plurality of second switching drivers.

Meanwhile, the sensing interface can be configured to output intensity information of the pointer light corresponding to a level of the difference between the first line voltage and the second line voltage.

Meanwhile, the plurality of second switching drivers can be configured to output the voltage of the second level during the display mode period, and can be configured not to output the voltage of the second level during the sensing mode period.

Meanwhile, the amplifier can include a multi-stage amplifier, wherein the display device can further include a resistor element and a capacitor element connected to an output terminal of the multi-stage amplifier.

Meanwhile, a resistance value of a resistor element connected to a first stage amplifier of the multi-stage amplifier can be preferably larger than a resistance value of a resistor element connected to a second-stage amplifier after the first stage amplifier.

Meanwhile, the multi-stage amplifier can be configured to output a signal with reduced noise by the resistor element and the capacitor element connected to the output terminal of the multi-stage amplifier.

Meanwhile, the display device can further include a timing controller configured to control the display mode period and the sensing mode period.

Meanwhile, the timing controller can be configured to perform the sensing mode after performing the display mode.

Meanwhile, in response to pointing coordinate information corresponding to the pointer light not being detected during the sensing mode period, the timing controller can be configured to control the display mode period to be longer than the sensing mode period.

Meanwhile, in response to the pointing coordinate information corresponding to the pointer light being detected during the sensing mode period, the timing controller can be configured to control the display mode period to be equal to or shorter than the sensing mode period.

Meanwhile, in response to the display mode period being shorter than the sensing mode period, the timing controller can be configured to increase a level of the scan signal or the first level or to decrease the second level.

Meanwhile, a signal processing device can be configured to output an image signal, including a pointer image, to the display device based on coordinate information of the pointer light from the display device.

Meanwhile, the signal processing device can be configured to output an image signal including a pointer image, of which size or brightness is changed, to the display device based on intensity information of the pointer light from the display device.

EFFECTS OF THE DISCLOSURE

A display device and an image display apparatus including the same according to an embodiment of the present disclosure include: a plurality of light emitting diodes arranged in a matrix form; a plurality of first switching drivers configured to supply a scan signal or a voltage of a first level to anodes of the plurality of light emitting diodes for each first line based on a switching operation during a display mode period; a plurality of second switching drivers configured to supply a voltage of a second level less than the first level to cathodes of the plurality of light emitting diodes for each second line based on the switching operation during the display mode period; a first switch configured to output the scan signal or the voltage of the first level during the display mode period and not output the scan signal or the voltage of the first level during a sensing mode period separate from the display mode period; a second switch configured to output the voltage of the second level during the display mode period and output a current flowing in at least one of the plurality of light emitting diodes based on a pointer light during the sensing mode period; and an amplifier configured to amplify a difference between a first line voltage and a second line voltage based on the current flowing in the light emitting diode during the sensing mode period. Accordingly, the pointer light can be stably sensed without a separate optical sensor.

Meanwhile, a current in a first direction can flow in at least some of the plurality of light emitting diodes during the display mode period, and a current in a second direction, opposite to the first direction, can flow in at least some of the plurality of light emitting diodes during the sensing mode period. Accordingly, the light emitting diodes can emit light based on the current in the first direction during the display mode period, and the pointer light can be stably sensed without a separate optical sensor based on the current in the second direction opposite to the first direction during the sensing mode period.

Meanwhile, in response to a difference between the voltage of the first level and the voltage of the second level, the current in the first direction can flow in at least some of the plurality of light emitting diodes during the display mode period and the current in the second direction opposite to the first direction can flow in at least some of the plurality of light emitting diodes during the sensing mode period. Accordingly, the pointer light can be stably sensed without a separate optical sensor during the sensing mode period.

Meanwhile, an anode voltage of the light emitting diode, on which the pointer light is incident, is less in the sensing mode period than in the display mode period, and a cathode voltage of the light emitting diode, on which the pointer light is incident, is greater in the sensing mode period than in the display mode period. Accordingly, the pointer light can be stably sensed without a separate optical sensor during the sensing mode period.

Meanwhile, the display device can further include: a first driver configured to output the scan signal or the voltage of the first level to the plurality of first switching drivers; and a second driver configured to output the voltage of the second level to the plurality of second switching drivers. Accordingly, the light emitting diodes can emit light during the display mode period.

Meanwhile, the display device can further include: a sensing controller configured to control a switching operation of the first switch and the second switch during the sensing mode period; and a sensing interface configured to supply a signal, output through the amplifier, to a timing controller. Accordingly, the coordinate information of the pointer light corresponding to the sensed pointer light can be stably output.

Meanwhile, the sensing controller can be configured to sequentially drive the plurality of first switching drivers and the plurality of second switching drivers during the sensing mode period, wherein the sensing interface can be configured to output coordinate information of the pointer light based on sequential driving of the plurality of first switching drivers and the plurality of second switching drivers. Accordingly, the coordinate information of the pointer light corresponding to the sensed pointer light can be stably output.

Meanwhile, the sensing interface can be configured to output intensity information of the pointer light corresponding to a level of the difference between the first line voltage and the second line voltage. Accordingly, the intensity information of the pointer light corresponding to the sensed pointer light can be stably output.

Meanwhile, the plurality of second switching drivers can be configured to output the voltage of the second level during the display mode period, and can be configured not to output the voltage of the second level during the sensing mode period. Accordingly, the pointer light can be stably sensed without a separate optical sensor during the sensing mode period.

Meanwhile, the amplifier can include a multi-stage amplifier, wherein the display device can further include a resistor element and a capacitor element connected to an output terminal of the multi-stage amplifier. Accordingly, the pointer light can be stably sensed without a separate optical sensor during the sensing mode period based on the signal with reduced noise.

Meanwhile, a resistance value of a resistor element connected to a first stage amplifier of the multi-stage amplifier can be preferably larger than a resistance value of a resistor element connected to a second-stage amplifier after the first stage amplifier. Accordingly, the pointer light can be stably sensed without a separate optical sensor during the sensing mode period based on the signal with reduced noise.

Meanwhile, the multi-stage amplifier can be configured to output a signal with reduced noise by the resistor element and the capacitor element connected to the output terminal of the multi-stage amplifier. Accordingly, the pointer light can be stably sensed without a separate optical sensor during the sensing mode period based on the signal with reduced noise Meanwhile, the display device can further include a timing controller configured to control the display mode period and the sensing mode period. Accordingly, the sensing mode period can be controlled.

Meanwhile, the timing controller can be configured to perform the sensing mode after performing the display mode. Accordingly, the sensing mode period can be controlled.

Meanwhile, in response to pointing coordinate information corresponding to the pointer light not being detected during the sensing mode period, the timing controller can be configured to control the display mode period to be longer than the sensing mode period. Accordingly, the sensing mode period can be flexibly controlled.

Meanwhile, in response to the pointing coordinate information corresponding to the pointer light being detected during the sensing mode period, the timing controller can be configured to control the display mode period to be equal to or shorter than the sensing mode period. Accordingly, the sensing mode period can be flexibly controlled.

Meanwhile, in response to the display mode period being shorter than the sensing mode period, the timing controller can be configured to increase a level of the scan signal or the first level or to decrease the second level. Accordingly, the brightness of an image displayed during the display mode period can be changed.

Meanwhile, a signal processing device can be configured to output an image signal, including a pointer image, to the display device based on coordinate information of the pointer light from the display device. Accordingly, the pointer image based on the pointer light can be stably displayed.

Meanwhile, the signal processing device can be configured to output an image signal including a pointer image, of which size or brightness is changed, to the display device based on intensity information of the pointer light from the display device. Accordingly, the pointer image, of which size is changed, can be displayed based on the intensity information of the pointer light.

DETAILED DESCRIPTION OF THE PREFERRED EMBODIMENTS

Hereinafter, the present disclosure will be described in detail with reference to the accompanying drawings.

Regarding constituent elements used in the following description, suffixes "module" and "unit" are given only in consideration of ease in the preparation of the specification, and do not have or serve as different meanings. Accordingly, the suffixes "module" and "unit" can be used interchangeably.

Figure 1:
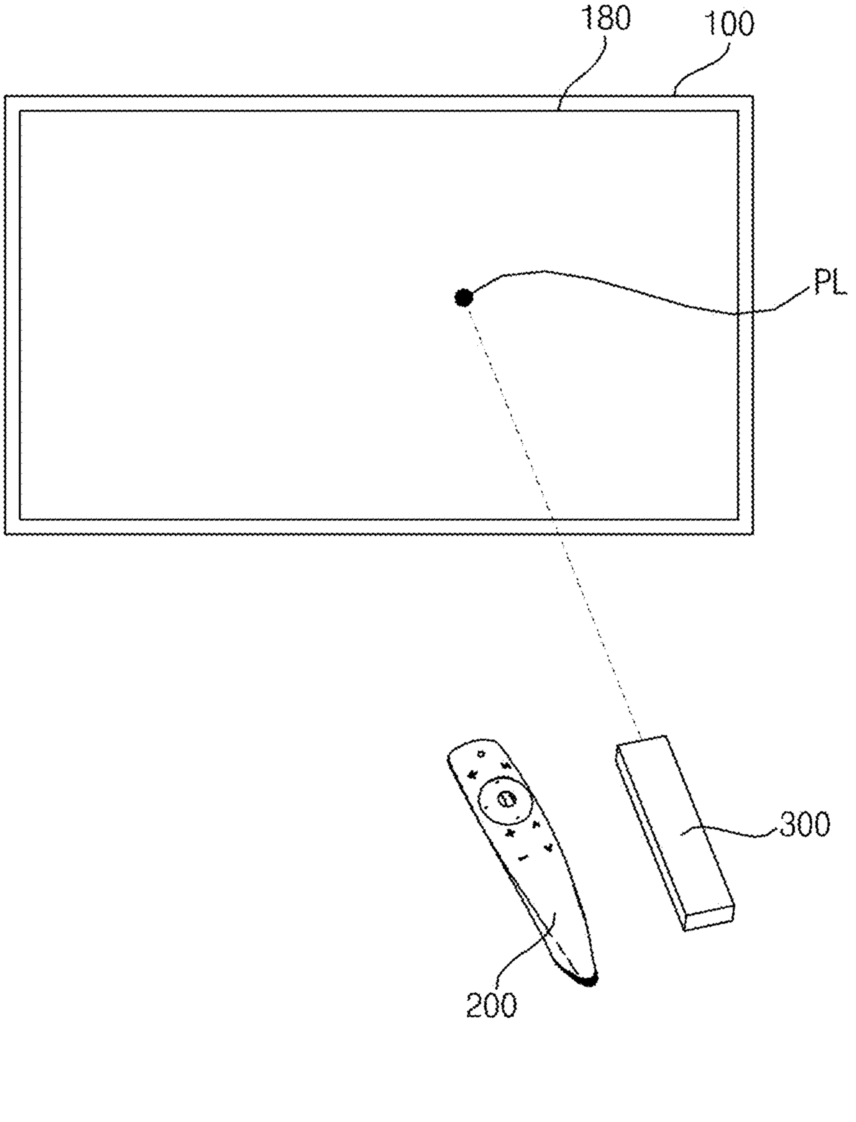
FIG. 1 is a diagram showing an image display apparatus according to an embodiment of the present disclosure.

FIG. 1 is a diagram showing an image display apparatus according to an embodiment of the present disclosure.

Referring to the figure, an image display apparatus 100 can include a display device 180.

The image display apparatus 100 can be configured to receive image signals from external devices and the like, and can perform signal processing on the signals to display an image on the display device 180.

For example, the image display apparatus 100 can be configured to receive image signals from a computer (PC), a mobile terminal 600 such as a smartphone, a set-top box (STB), a game console (GSB), a server (SVR), etc., and can perform signal processing on the image signals to display an image on the display device 180.

Meanwhile, the display device 180 can include light emitting diodes.

Particularly, the display device 180 can include a mini-LED panel or a micro-LED panel, and the like which are self-luminous elements.

Meanwhile, the image display apparatus 100 can operate based on a pointing signal from a remote controller 200 or a pointing light from a pointing device 300.

Meanwhile, the present disclosure provides a method of stably sensing a pointer light PL by using light emitting diodes as self-luminous elements without a separate optical sensor, which will be described in further detail with reference to FIG. 5 and subsequent figures.

Meanwhile, the image display apparatus 100 of FIG. 1 can be a TV, a monitor, a tablet PC, a mobile terminal, a vehicle display device, and the like.

Figure 2:
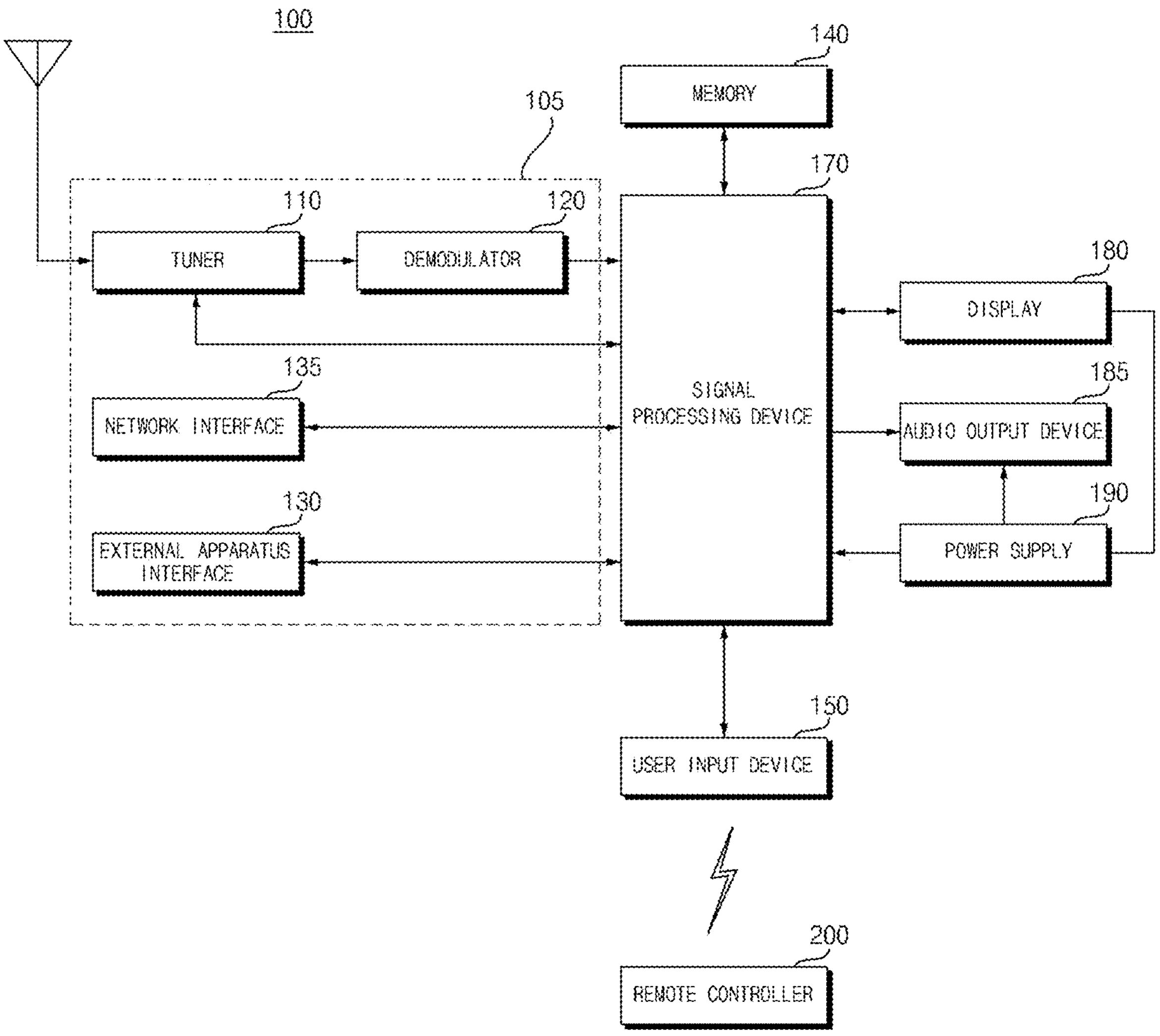
FIG. 2 is an exemplary internal block diagram of the image display apparatus of FIG. 1.

FIG. 2 is an exemplary internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processing device 170, a display device 180, and an audio output device 185.

The image receiver 105 can include a tuner 110, a demodulator 120, a network interface 135, and an external apparatus interface 130.

Meanwhile, unlike the figure, the image receiver 105 can include only the tuner 110, the demodulator 120, and the external apparatus interface 130. That is, the network interface 135 cannot be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

The tuner 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 can perform demodulation and channel decoding and then output a stream signal TS. At this time, the stream signal can be a multiplexed signal of an image signal, an audio signal, or a data control signal.

The stream signal output from the demodulator 120 can be input to the signal processing device 170. The signal processing device 170 performs demultiplexing, image/audio signal processing, and the like, and then outputs an image to the display device 180 and outputs audio to the audio output device 185.

The external apparatus interface 130 can be configured to transmit or receive data with a connected external apparatus (not shown), e.g., a set-top box STB. To this end, the external apparatus interface 130 can include an A/V input and output device (not shown).

The external apparatus interface 130 can be connected in wired or wirelessly to an external apparatus, such as a digital versatile disk (DVD), a Blu ray, a game equipment, a camera, a camcorder, a computer (note book), and a set-top box, and can perform an input/output operation with an external apparatus.

The A/V input and output device can be configured to receive image and audio signals from an external apparatus. Meanwhile, a wireless transceiver (not shown) can perform short-range wireless communication with other electronic apparatus.

Through the wireless transceiver (not shown), the external apparatus interface 130 can exchange data with an adjacent mobile terminal 600. In particular, in a mirroring mode period, the external apparatus interface 130 can be configured to receive device information, executed application information, application image, and the like from the mobile terminal 600.

The network interface 135 provides an interface for connecting the image display apparatus 100 to a wired/wireless network including the Internet network. For example, the network interface 135 can be configured to receive, via the network, content or data provided by the Internet, a content provider, or a network operator.

Meanwhile, the network interface 135 can include a wireless transceiver (not shown).

The memory 140 can store a program for each signal processing and control in the signal processing device 170, and can store signal-processed image, audio, or data control signal.

In addition, the memory 140 can serve to temporarily store image, audio, or data control signal input to the external apparatus interface 130. In addition, the memory 140 can store information on a certain broadcast channel through a channel memory function, such as a channel map.

Although FIG. 2 illustrates that the memory is provided separately from the signal processing device 170, the scope of the present disclosure is not limited thereto. The memory 140 can be included in the signal processing device 170.

The user input interface 150 transmits a signal input by the user to the signal processing device 170 or transmits a signal from the signal processing device 170 to the user.

For example, it can be configured to transmit/receive a user input signal, such as power on/off, channel selection, screen setting, etc., from a remote controller 200, can transfer a user input signal input from a local key (not shown), such as a power key, a channel key, a volume key, a set value, etc., to the signal processing device 170, can transfer a user input signal input from a sensor device (not shown) that senses a user's gesture to the signal processing device 170, or can be configured to transmit a signal from the signal processing device 170 to the sensor device (not shown).

The signal processing device 170 can demultiplex the input stream through the tuner 110, the demodulator 120, the network interface 135, or the external apparatus interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a processed image signal.

The image signal processed by the signal processing device 170 is input to the display device 180, and can be displayed as an image corresponding to the image signal. In addition, the image signal processed by the signal processing device 170 can be input to the external output apparatus through the external apparatus interface 130.

The audio signal processed by the signal processing device 170 can be output to the audio output device 185 as an audio signal. In addition, audio signal processed by the signal processing device 170 can be input to the external output apparatus through the external apparatus interface 130.

Although not shown in FIG. 2, the signal processing device 170 can include a demultiplexer, an image processor, and the like. That is, the signal processing device 170 can perform a variety of signal processing and thus it can be implemented in the form of a system on chip (SOC). This will be described later with reference to FIG. 3.

In addition, the signal processing device 170 can control the overall operation of the image display apparatus 100. For example, the signal processing device 170 can control the tuner 110 to control the tuning of the RF broadcast corresponding to the channel selected by the user or the previously stored channel.

In addition, the signal processing device 170 can control the image display apparatus 100 according to a user command input through the user input interface 150 or an internal program.

Meanwhile, the signal processing device 170 can control the display device 180 to display an image. At this time, the image displayed on the display device 180 can be a still image or a moving image, and can be a 2D image or a 3D image.

Meanwhile, the signal processing device 170 can display a certain object in an image displayed on the display device 180. For example, the object can be at least one of a connected web screen (newspaper, magazine, etc.), an electronic program guide (EPG), various menus, a widget, an icon, a still image, a moving image, and a text.

Meanwhile, the signal processing device 170 can recognize the position of the user based on the image photographed by a photographing device (not shown). For example, the distance (z-axis coordinate) between a user and the image display apparatus 100 can be determined. In addition, the x-axis coordinate and the y-axis coordinate in the display device 180 corresponding to a user position can be determined.

The display device 180 generates a driving signal by converting an image signal, a data control signal, an OSD signal, a control signal processed by the signal processing device 170, an image signal, a data control signal, a control signal, and the like received from the external apparatus interface 130.

Meanwhile, the display device 180 can be configured as a touch screen and used as an input device in addition to an output device.

The audio output device 185 receives a signal processed by the signal processing device 170 and outputs it as an audio.

The photographing device (not shown) photographs a user. The photographing device (not shown) can be implemented by a single camera, but the present disclosure is not limited thereto and can be implemented by a plurality of cameras. Image information photographed by the photographing device (not shown) can be input to the signal processing device 170.

The signal processing device 170 can be configured to sense a gesture of the user based on each of the images photographed by the photographing device (not shown), the signals detected from the sensor device (not shown), or a combination thereof.

The power supply 190 supplies corresponding power to the image display apparatus 100. Particularly, the power can be supplied to a signal processing device 170 which can be implemented in the form of a system on chip (SOC), a display device 180 for displaying an image, and an audio output device 185 for outputting an audio.

Specifically, the power supply 190 can include a converter to convert an AC power into a DC voltage, and a DC/DC converter to convert the level of the DC voltage.

The remote controller 200 transmits the user input to the user input interface 150. To this end, the remote controller 200 can use Bluetooth, a radio frequency (RF) communication, an infrared (IR) communication, an Ultra Wideband (UWB), ZigBee, or the like. In addition, the remote controller 200 can be configured to receive the image, audio, or data control signal output from the user input interface 150, and display it on the remote controller 200 or output it as an audio.

Meanwhile, the image display apparatus 100 can be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram can be integrated, added, or omitted according to a specification of the image display apparatus 100 actually implemented. That is, two or more components can be combined into a single component as needed, or a single component can be split into two or more components. The function performed in each block is described for the purpose of illustrating embodiments of the present disclosure, and specific operation and apparatus do not limit the scope of the present disclosure.

Figure 3:
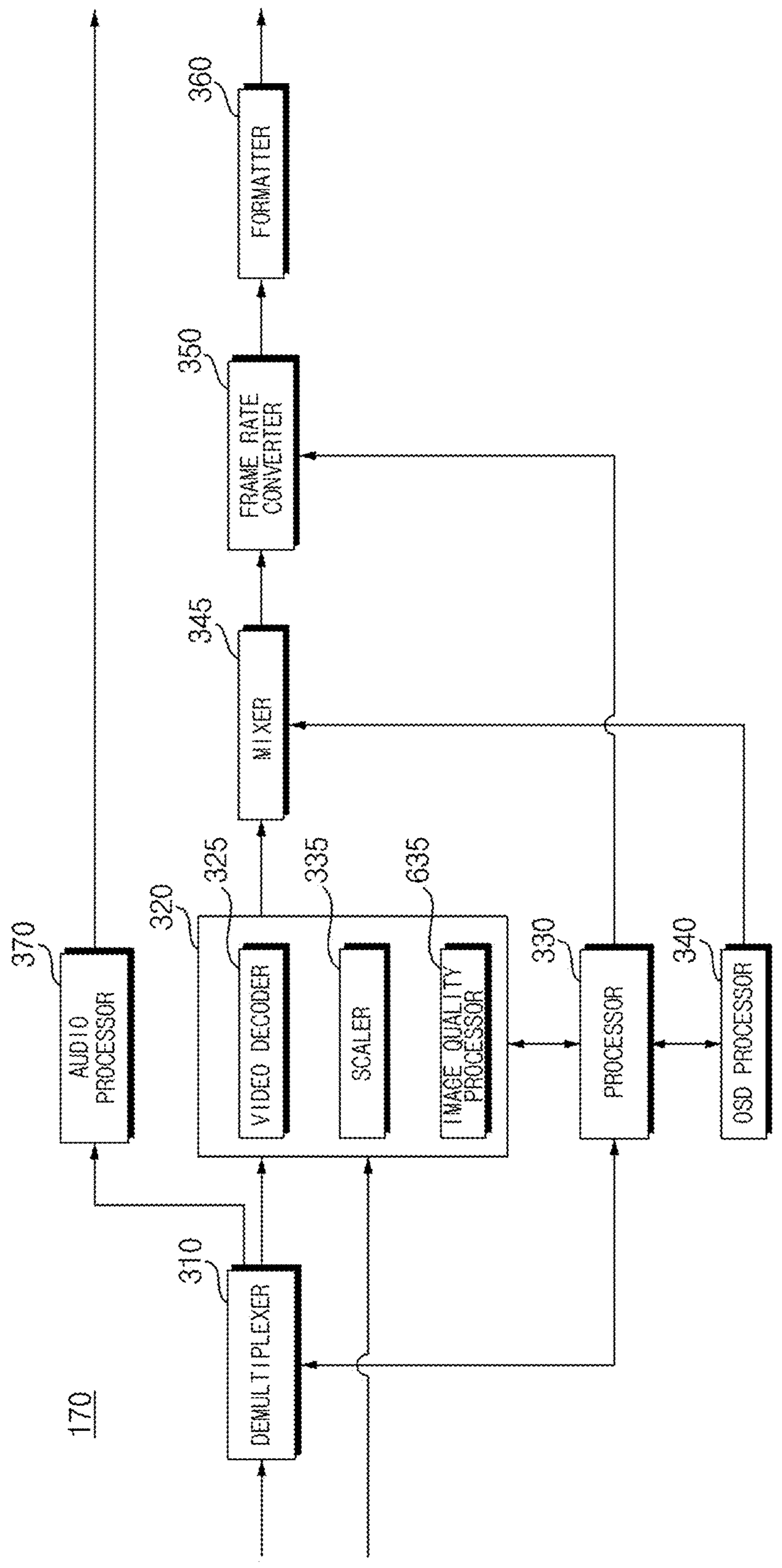
FIG. 3 is an exemplary internal block diagram of the signal processing device in FIG. 2.

FIG. 3 is an exemplary internal block diagram of the signal processing device in FIG. 2.

Referring to the figure, the signal processing device 170 according to an embodiment of the present disclosure can include a demultiplexer 310, an image processor 320, a processor 330, and an audio processor 370. In addition, the signal processing device 170 can further include and a data processor (not shown).

The demultiplexer 310 demultiplexes the input stream. For example, when an MPEG-2 TS is input, it can be demultiplexed into image, audio, and data control signal, respectively. Here, the stream signal input to the demultiplexer 310 can be a stream signal output from the tuner 110, the demodulator 120, or the external apparatus interface 130.

The image processor 320 can perform signal processing on an input image. For example, the image processor 320 can perform image processing on an image signal demultiplexed by the demultiplexer 310.

To this end, the image processor 320 can include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display device 180.

The image decoder 325 can include a decoder of various standards. For example, a 3D image decoder for MPEG-2, H.264 decoder, a color image, and a depth image, and a decoder for a multiple view image can be provided.

The scaler 335 can scale an input image signal decoded by the image decoder 325 or the like.

For example, if the size or resolution of an input image signal is small, the scaler 335 can upscale the input image signal, and, if the size or resolution of the input image signal is great, the scaler 335 can downscale the input image signal.

The image quality processor 635 can perform image quality processing on an input image signal decoded by the image decoder 325 or the like.

For example, the image quality processor 635 can perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially a display panel, etc.

The OSD processor 340 generates an OSD signal according to a user input or by itself. For example, based on a user input signal, the OSD processor 340 can generate a signal for displaying various information as a graphic or a text on the screen of the display device 180. The generated OSD signal can include various data, such as a user interface screen of the image display apparatus 100, various menu screens, a widget, and an icon. In addition, the generated OSD signal can include a 2D object or a 3D object.

In addition, the OSD processor 340 can generate a pointer that can be displayed on the display, based on a pointing signal input from the remote controller 200. In particular, such a pointer can be generated by a pointing signal processing device, and the OSD processor 340 can include such a pointing signal processing device (not shown). Obviously, the pointing signal processing device (not shown) can be provided separately from the OSD processor 340.

The frame rate converter (FRC) 350 can convert a frame rate of an input image. Meanwhile, the frame rate converter 350 can be configured to output the input image without converting the frame rate.

Meanwhile, the formatter 360 can change a format of an input image signal into a format suitable for displaying the image signal on a display and output the image signal in the changed format.

In particular, the formatter 360 can change a format of an image signal to correspond to a display panel.

The processor 330 can control overall operations of the image display apparatus 100 or the signal processing device 170.

For example, the processor 330 can control the tuner 110 to control the tuning of an RF broadcast corresponding to a channel selected by a user or a previously stored channel.

In addition, the processor 330 can control the image display apparatus 100 according to a user command input through the user input interface 150 or an internal program.

In addition, the processor 330 can be configured to transmit data to the network interface 135 or to the external apparatus interface 130.

In addition, the processor 330 can control the demultiplexer 310, the image processor 320, and the like in the signal processing device 170.

Meanwhile, the audio processor 370 in the signal processing device 170 can perform the audio processing of the demultiplexed audio signal. To this end, the audio processor 370 can include various decoders.

In addition, the audio processor 370 in the signal processing device 170 can process a base, a treble, a volume control, and the like.

The data processor (not shown) in the signal processing device 170 can perform data processing of the demultiplexed data control signal. For example, when the demultiplexed data control signal is a coded data control signal, it can be decoded. The encoded data control signal can be electronic program guide information including broadcast information, such as a start time and an end time of a broadcast program broadcasted on each channel.

Meanwhile, a block diagram of the signal processing device 170 shown in FIG. 3 is a block diagram for an embodiment of the present disclosure. Each component of the block diagram can be integrated, added, or omitted according to a specification of the signal processing device 170 actually implemented.

In particular, the frame rate converter 350 and the formatter 360 can be provided separately in addition to the image processor 320.

Figure 4A:
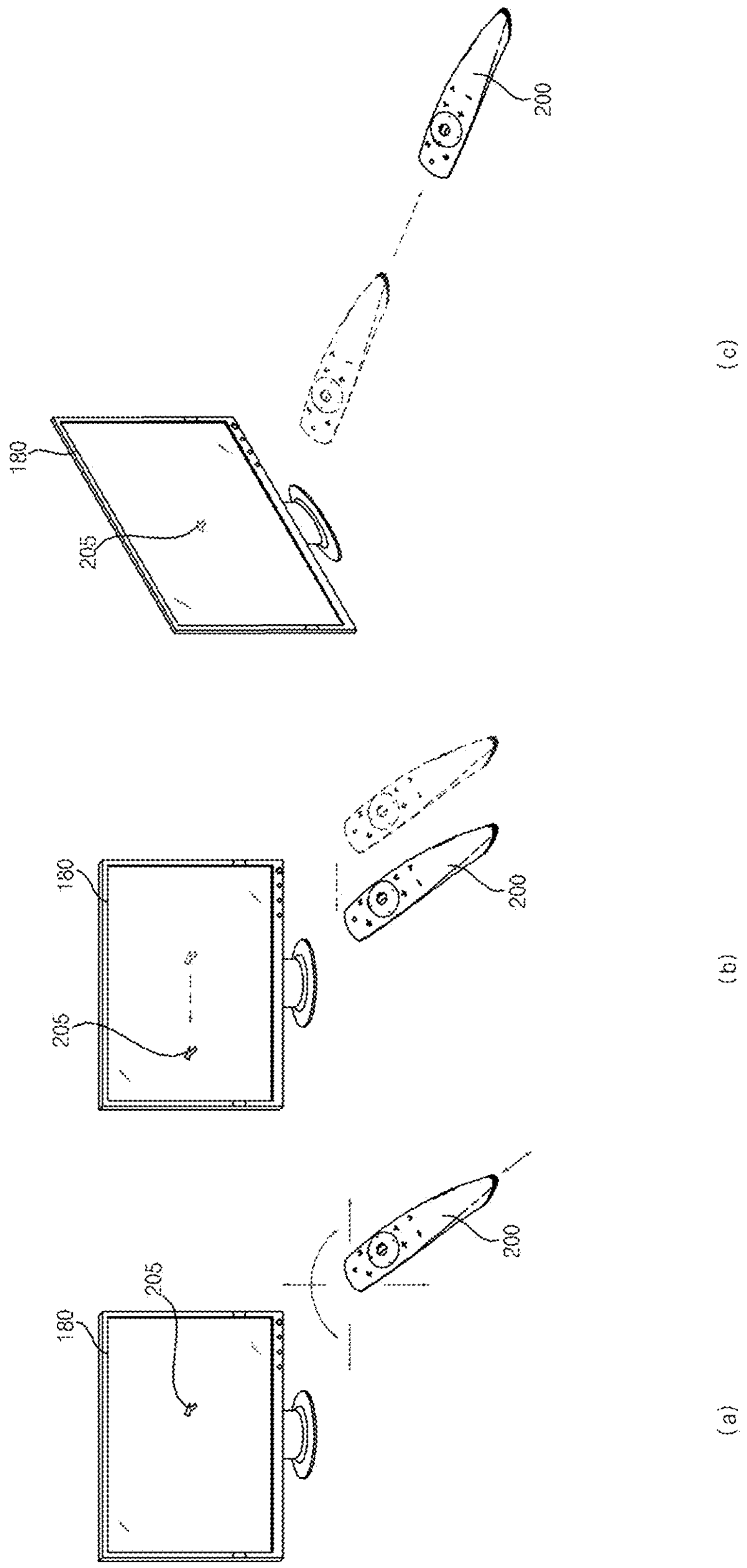
FIG. 4A is a diagram showing a method of controlling a remote controller of FIG. 2.

FIG. 4A is a diagram illustrating a control method of a remote controller of FIG. 2.

As shown in FIG. 4A (a), it is illustrated that a pointer 205 corresponding to the remote controller 200 is displayed on the display device 180.

The user can move or rotate the remote controller 200 up and down, left and right (FIG. 4A(b)), and back and forth (FIG. 4A(c)). The pointer 205 displayed on the display device 180 of the image display apparatus corresponds to the motion of the remote controller 200. Such a remote controller 200 can be referred to as a space remote controller or a 3D pointing apparatus, because the pointer 205 is moved and displayed according to the movement in a 3D space, as shown in the figure.

FIG. 4A(b) illustrates that when the user moves the remote controller 200 to the left, the pointer 205 displayed on the display device 180 of the image display apparatus also moves to the left correspondingly.

Information on the motion of the remote controller 200 detected through a sensor of the remote controller 200 is transmitted to the image display apparatus. The image display apparatus can calculate the coordinate of the pointer 205 from the information on the motion of the remote controller 200. The image display apparatus can display the pointer 205 to correspond to the calculated coordinate.

FIG. 4A(c) illustrates a case where the user moves the remote controller 200 away from the display device 180, while pressing a specific button of the remote controller 200. Thus, a selection area within the display device 180 corresponding to the pointer 205 can be zoomed in so that it can be displayed to be enlarged. Meanwhile, when the user moves the remote controller 200 close to the display device 180, the selection area within the display device 180 corresponding to the pointer 205 can be zoomed out so that it can be displayed to be reduced. Meanwhile, when the remote controller 200 moves away from the display device 180, the selection area can be zoomed out, and when the remote controller 200 approaches the display device 180, the selection area can be zoomed in.

Meanwhile, when the specific button of the remote controller 200 is pressed, it is possible to exclude the recognition of vertical and lateral movement. That is, when the remote controller 200 moves away from or approaches the display device 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 can correspond to the moving speed or the moving direction of the remote controller 200.

Figure 4B:
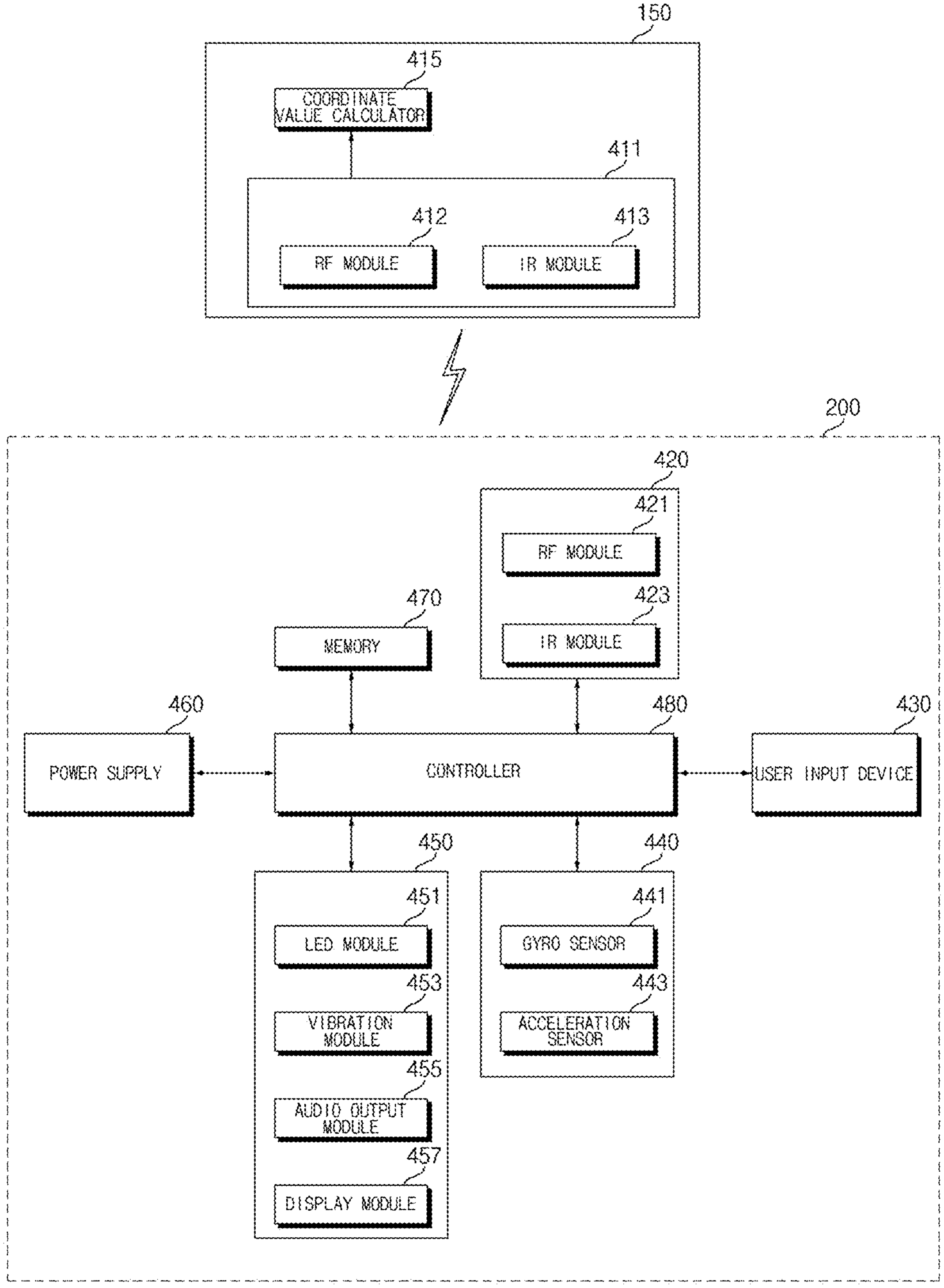
FIG. 4B is an internal block diagram of the remote controller of FIG. 2.

FIG. 4B is an internal block diagram of the remote controller of FIG. 2.

Referring to the figure, the remote controller 200 includes a wireless transceiver 425, a user input device 435, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 can include an RF module 421 for transmitting and receiving signals to and from the image display apparatus 100 according to a RF communication standard. In addition, the remote controller 200 can include an IR module 423 for transmitting and receiving signals to and from the image display apparatus 100 according to an IR communication standard.

In the present embodiment, the remote controller 200 transmits a signal containing information on the motion of the remote controller 200 to the image display apparatus 100 through the RF module 421.

In addition, the remote controller 200 can be configured to receive the signal transmitted by the image display apparatus 100 through the RF module 421. In addition, if necessary, the remote controller 200 can be configured to transmit a command related to power on/off, channel change, volume change, and the like to the image display apparatus 100 through the IR module 423.

The user input device 435 can be implemented by a keypad, a button, a touch pad, a touch screen, or the like. The user can operate the user input device 435 to input a command related to the image display apparatus 100 to the remote controller 200. When the user input device 435 includes a hard key button, the user can input a command related to the image display apparatus 100 to the remote controller 200 through a push operation of the hard key button. When the user input device 435 includes a touch screen, the user can touch a soft key of the touch screen to input the command related to the image display apparatus 100 to the remote controller 200. In addition, the user input device 435 can include various types of input means, such as a scroll key, a jog key, etc., which can be operated by the user, and the present disclosure does not limit the scope of the present disclosure.

The sensor device 440 can include a gyro sensor 441 or an acceleration sensor 443. The gyro sensor 441 can be configured to sense information regarding the motion of the remote controller 200.

For example, the gyro sensor 441 can be configured to sense information on the operation of the remote controller 200 based on the x, y, and z axes. The acceleration sensor 443 can be configured to sense information on the moving speed of the remote controller 200. Meanwhile, a distance measuring sensor can be further provided, and thus, the distance to the display device 180 can be sensed.

The output device 450 can be configured to output an image or an audio signal corresponding to the operation of the user input device 435 or a signal transmitted from the image display apparatus 100. Through the output device 450, the user can recognize whether the user input device 435 is operated or whether the image display apparatus 100 is controlled.

For example, the output device 450 can include an LED module 451 that is turned on when the user input device 435 is operated or a signal is transmitted/received to/from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 can stop the supply of power to reduce a power waste. The power supply 460 can resume power supply when a certain key provided in the remote controller 200 is operated.

The memory 470 can store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 can store information regarding a frequency band or the like for wirelessly transmitting and receiving a signal to/from the image display apparatus 100 paired with the remote controller 200 in the memory 470 and can refer to the stored information.

The controller 480 controls various matters related to the control of the remote controller 200. The controller 480 can be configured to transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that can wirelessly transmit and receive a signal to and from the remote controller 200 and a coordinate value calculator 415 that can calculate the coordinate value of a pointer corresponding to the operation of the remote controller 200.

The user input interface 150 can wirelessly transmit and receive a signal to and from the remote controller 200 through the RF module 412. In addition, the user input interface 150 can be configured to receive a signal transmitted by the remote controller 200 through the IR module 413 according to an IR communication standard.

The coordinate value calculator 415 can correct a hand shake or an error from a signal corresponding to the operation of the remote controller 200 received through the wireless transceiver 151 and calculate the coordinate value (x, y) of the pointer 205 to be displayed on the display device 180.

The transmission signal of the remote controller 200 inputted to the image display apparatus 100 through the user input interface 150 is transmitted to the controller 180 of the image display apparatus 100. The controller 180 can determine the information on the operation of the remote controller 200 and the key operation from the signal transmitted from the remote controller 200, and, correspondingly, control the image display apparatus 100.

For another example, the remote controller 200 can calculate the pointer coordinate value corresponding to the operation and output it to the user input interface 150 of the image display apparatus 100. In this case, the user input interface 150 of the image display apparatus 100 can be configured to transmit information on the received pointer coordinate value to the controller 180 without a separate correction process of hand shake or error.

For another example, unlike the figure, the coordinate value calculator 415 can be provided in the signal processing device 170, not in the user input interface 150.

Figure 5:
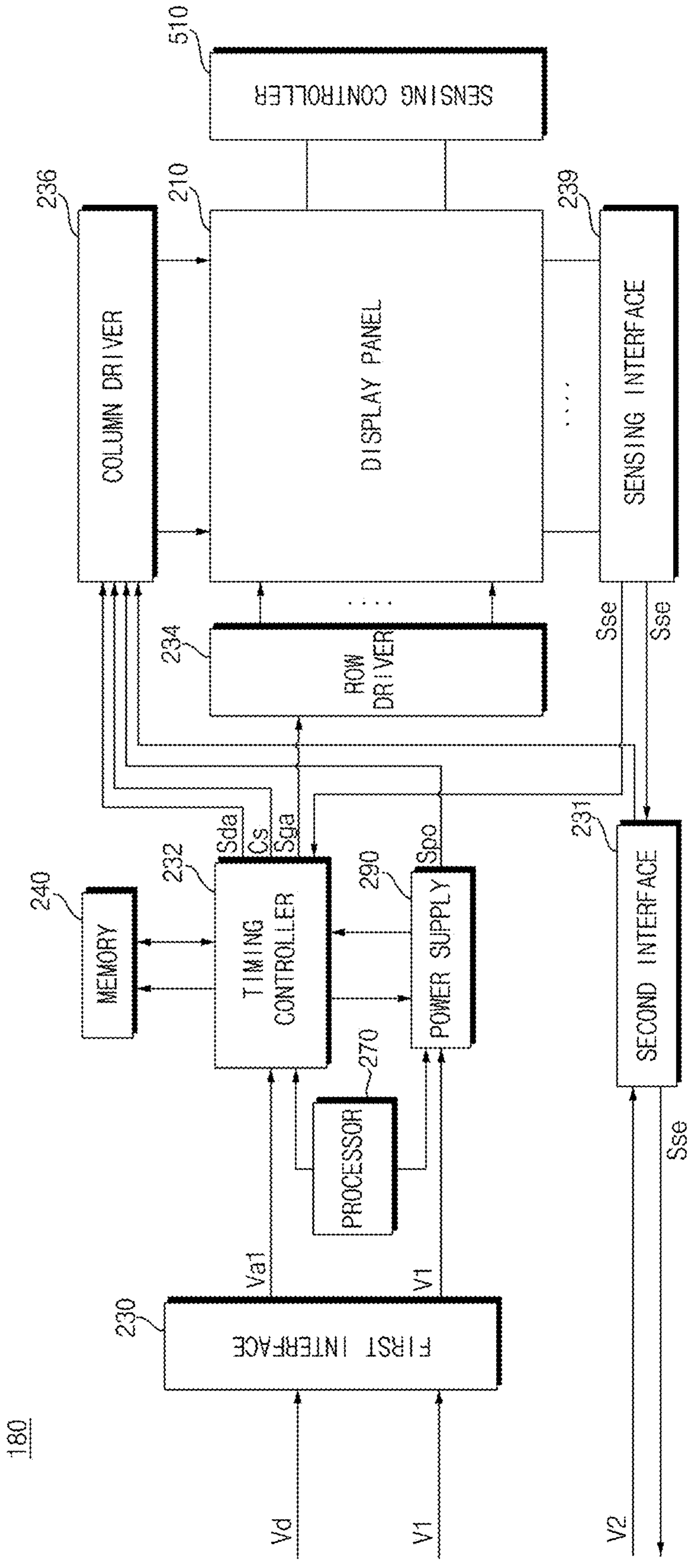
FIG. 5 is an internal block diagram of the display device of FIG. 1.

FIG. 5 is an internal block diagram of the display device of FIG. 1.

Referring to FIG. 5, a light emitting diode-based display device 180 can include a display panel 210, a first interface 230, a second interface 231, a timing controller 232, a row driver 234, a column driver 236, a sensing interface 239, a memory 240, a processor 270, a power supply 290, a sensing controller 510, and the like.

The display device 180 receives a video signal Vd, first DC power V1, and second DC power V2, and can display a predetermined image based on the video signal Vd.

Meanwhile, the interface 230 in the display device 180 can be configured to receive the video signal Vd and the first DC power V1 from the signal processing device 170.

Here, the first DC power V1 can be used for the operation of the power supply 290 and the timing controller 232 in the display device 180.

Next, the second interface 231 can be configured to receive the second DC power V2 from an external power supply 190. Meanwhile, the second DC power V2 can be input to the column driver 236 in the display device 180.

The timing controller 232 can be configured to output a data control signal and a scan control signal based on the video signal Vd.

For example, when the first interface 230 converts the input video signal Vd and outputs the converted video signal val, the timing controller 232 can be configured to output the data control signal and the scan control signal based on the converted video signal val.

The timing controller 232 can further receive a control signal, a vertical synchronization signal Vsync, etc., in addition to the video signal Vd from the signal processing device 170.

In addition, the timing controller 232 can be configured to output the scan control signal for the operation of the row driver 234 and the data control signal for the operation of the column driver 236, based on the control signal, the vertical synchronization signal Vsync, and the like in addition to the video signal Vd.

In this case, the data control signal can be a data control signal for driving RGB subpixels when the panel 210 includes RGB subpixels.

Meanwhile, the timing controller 232 can further output a control signal Cs to the row driver 234.

The row driver 234 and the column driver 236 can be configured to supply the scan signal and the data signal to the display panel 210 through a row line and a column line, respectively, according to the scan control signal and the data control signal from the timing controller 232. Accordingly, the display panel 210 displays a predetermined video.

Meanwhile, the display panel 210 can include a plurality of light emitting diodes, and can be arranged so that a plurality of row lines and a plurality of column lines intersect in a matrix form in each pixel corresponding to the plurality of light emitting diodes.

Meanwhile, the plurality of light emitting diodes in the display panel 210 can be configured to output green light, red light, and blue light, respectively, according to a display mode.

Meanwhile, the display panel 210 can be configured to sense coordinate information Sse and intensity information of the incident pointer light according to a sensing mode.

Meanwhile, the column driver 236 can be configured to output a data control signal to the display panel 210 based on the second DC power V2 from the second interface 231.

The power supply 290 can be configured to supply various levels of power to the row driver 234, the column driver 236, the timing controller 232, and the like.

The sensing interface 239 can be configured to transmit the coordinate information Sse or intensity information of the incident pointer light to the second interface 231, the timing controller 232, or the processor 270 according to the sensing mode.

Meanwhile, the sensing controller 510 can be configured to sequentially drive first switching drivers RSS (FIG. 7) and a plurality of second switching drivers CSS (FIG. 7), which are connected to the plurality of light emitting diodes during a sensing mode period Psa.

The processor 270 can perform various control operations in the display device 180. For example, the processor 270 can control the row driver 234, the column driver 236, the timing controller 232, and the like.

Meanwhile, the processor 270 can be configured to receive the coordinate information Sse or intensity information of the incident pointer light from the sensing interface 239.

Meanwhile, the second interface 231 can be configured to transmit the coordinate information Sse or intensity information of the pointer light to an external signal processing device 170.

In response thereto, the signal processing device 170 can be configured to output an image signal including a pointer image 201 to the display device 180 based on the coordinate information Sse of the pointer light PL from the display device 180.

Alternatively, the signal processing device 170 can be configured to output an image signal including a pointer image 201, of which size or brightness is changed, to the display device 180 based on the intensity information of the pointer light PL from the display device 180.

Figure 6:
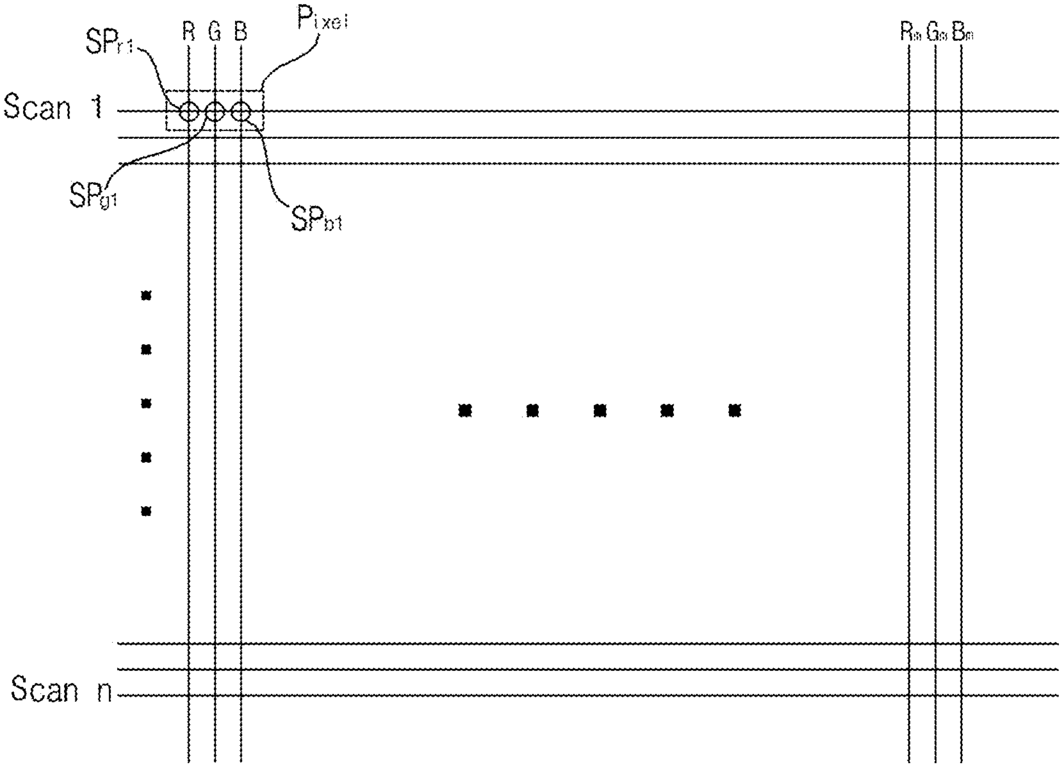
FIG. 6 is a diagram illustrating a pixel in the display panel of FIG. 5.

FIG. 6 is a diagram illustrating a pixel in the display panel of FIG. 5.

Referring to FIG. 6A, the display panel 210 can include a plurality of scan lines Scan 1 to Scan n and a plurality of data lines R1, G1, B1, to Rm, Gm, and Bm intersecting the scan lines.

Meanwhile, a pixel (subpixel) is defined in an intersecting area of the scan lines and the data lines in the display panel 210. In the drawing, a pixel having sub-pixels SR1, SG1, and SB1 of RGB is shown.

Meanwhile, a red light emitting diode, a green light emitting diode, and a blue light emitting diode are disposed in the subpixels SR1, SG1, and SB1, respectively.

Meanwhile, the red light emitting diode, the green light emitting diode, and the blue light emitting diode can be micro light emitting diodes.

Figure 7:
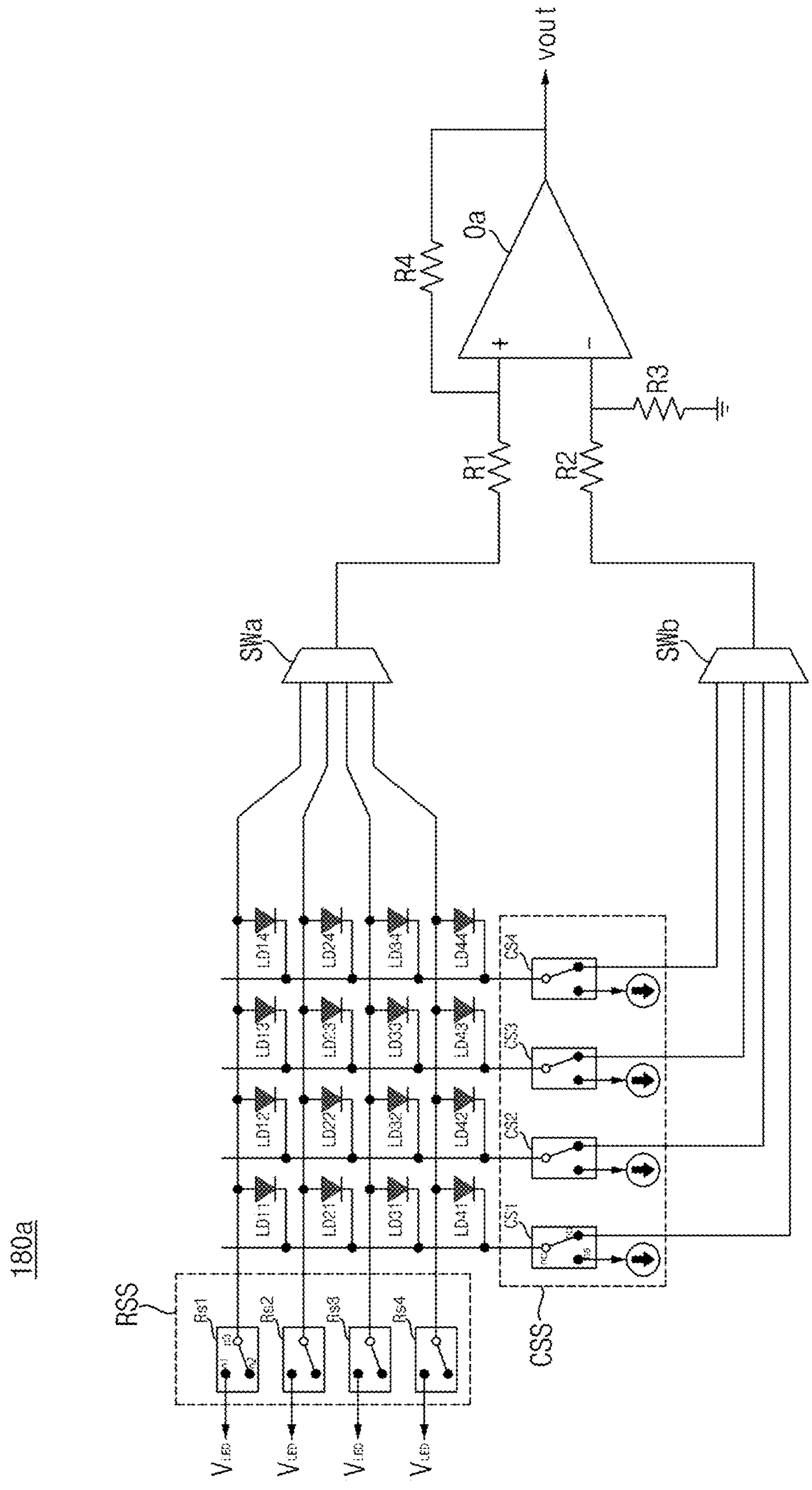
FIG. 7 is an exemplary internal circuit diagram of a display device according to an embodiment of the present disclosure.

FIG. 7 is an exemplary internal circuit diagram of a display device according to an embodiment of the present disclosure.

Referring to FIG. 7, a display device 180*a* according to an embodiment of the present disclosure includes: a plurality of light emitting diodes LD11 to LD44 arranged in a matrix form; a plurality of first switching drivers RSS configured to supply a scan signal or a voltage of a first level LV1 to anodes of the plurality of light emitting diodes LD11 to LD44 for each first line based on a switching operation during a display mode period Pda; a plurality of second switching drivers CSS configured to supply a voltage Sbb at a second level LVm, less than the first level LV1, to cathodes of the plurality of light emitting diodes LD11 to LD44 for each second line based on the switching operation during the display mode period Pda; a first switch SWa configured to output the scan signal or the voltage of the first level LV1 during the display mode period Pda and not output the scan signal or the voltage of the first level LV1 during a sensing mode period Psa separate from the display mode period Pda; a second switch SWb configured to output the voltage Sbb at the second level LVm during the display mode period Pda and output a current flowing in at least one of the plurality of light emitting diodes LD11 to LD44 based on a pointer light PL during the sensing mode period Psa; and an amplifier Oa configured to amplify a difference DFb between a first line voltage LV2 and a second line voltage LVp based on the current flowing in the light emitting diode during the sensing mode period Psa. Accordingly, the pointer light PL can be stably sensed without a separate optical sensor.

Meanwhile, in the drawing, 16 light emitting diodes arranged in a 4×4 matrix are illustrated, but the present disclosure is not limited thereto, and various numbers of light emitting diodes can be arranged in an m×n matrix.

Meanwhile, the plurality of first switching drivers RSS can include four first switching drivers Rs1 to Rs4 corresponding to four scan lines.

Meanwhile, each of the first switching drivers Rs1 to Rs4 includes three nodes, in which a third node n3 among first to third nodes n1 to n3 is connected to the anode of each light emitting diode and the first node n1 is connected to the third node n3 by the switching operation in the display mode to deliver the scan signal or the voltage of the first level LV1 to the third node n3, and the second node n2 is connected to the third node n3 by the switching operation in the sensing mode to prevent the scan signal or the voltage of the first level LV1 from being delivered to the third node n3.

Meanwhile, the plurality of second switching drivers CSS can include four second switching drivers Cs1 to Cs4 corresponding to four data lines.

Meanwhile, each of the second switching drivers Cs1 to Cs4 includes three nodes, in which a third node nc among first to third nodes na to nc is connected to the cathode of each light emitting diode and the first node na is connected to the third node nc by the switching operation in the display mode to deliver the voltage of the second level LVm less than the first level LV1 to the third node nc, and the second node nb is connected to the third node nc by the switching operation in the sensing mode to prevent the voltage of the second level LVm from being delivered to the third node nc.

That is, in the sensing mode, the second node nb of each of the second switching drivers Cs1 to Cs4 is connected to the second switch SWb.

In the present disclosure, the light emitting diode emits light during the display mode period by using the forward current of the light emitting diode and the pointer light is sensed during the sensing mode period by using the backward or reverse current of the light emitting diode, and thus no separate optical sensor is required.

Meanwhile, in the present disclosure, coordinate information and intensity information of the pointer light can be obtained based on the level of the backward or reverse current of the light emitting diode that increases in proportion to the amount of incident pointer light.

To this end, the plurality of light emitting diodes LD11 to LD44 operate separately in the display mode period and the sensing mode period.

During the display mode period, the scan signal or the voltage of the first level LV1 is sequentially applied for each of the row lines of the plurality of light emitting diodes LD11 to LD44, and the voltage of the second level LVm less than the first level LV1 is sequentially applied for each of the column lines of the plurality of light emitting diodes LD11 to LD44.

Accordingly, the light emitting diode emits light in such a manner that during the display mode period, the voltage of the first level LV1 is supplied to the anode of the light emitting diode, the voltage of the second level LVm is supplied to the cathode of the light emitting diode, and the forward current flows in the light emitting diode based on a voltage difference between the first level LV1 and the second level LVm.

During the sensing mode period, a low level voltage at the level LVc is applied to the row lines of the plurality of light emitting diodes LD11 to LD44, and a low level voltage at the level LVn is applied to the column lines of the plurality of light emitting diodes LD11 to LD44. In this case, the level LVc and the level LVn can also be equal to each other.

Accordingly, the forward current does not flow in the plurality of light emitting diodes LD11 to LD44 during the sensing mode period, such that the plurality of light emitting diodes LD11 to LD44 cannot emit light.

Meanwhile, when the pointer light PLis incident on a specific light emitting diode location, e.g., light emitting diode LD33, during the sensing mode period, a cathode voltage of the light emitting diode LD33 increases with the amount of the pointer light PL, and thus becomes larger than an anode voltage.

Accordingly, the backward current flows in the light emitting diode LD33, and the first line voltage LVc which is the anode voltage of the light emitting diode LD33 is supplied to the first switch SWa, and the second line voltage LVp which is the cathode voltage of the light emitting diode LD33 is supplied to the second switch SWb.

In addition, the amplifier Oa amplifies a difference DFb between the first line voltage LVc and the second line voltage LVp based on the current flowing in the light emitting diode LD33.

Accordingly, the coordinate information of the pointer light PL can be output based on the backward current flowing in the light emitting diode LD33 during the sensing mode period.

Particularly, the sensing controller 510 controls the switching operation of the first switch SWa and the second switch SWb during the sensing mode period Psa, such that the sensing interface 239 can be configured to output the coordinate information of the pointer light PL to the timing controller 232 or the second interface 231 based on the signal output through the amplifier Oa.

Specifically, the sensing controller 510 can be configured to sequentially drive the first switching drivers Rs1 to Rs4 and sequentially drive the second switching drivers Cs1 to Cs4 during sensing mode period Psa.

In addition, when the sensing controller 510 sequentially drives the first switching drivers Rs1 to Rs4 and the second switching drivers Cs1 to Cs4, the sensing interface 239 can be configured to calculate and output the coordinate information of the pointer light PL based on a timing of the signal output by the amplifier Oa.

Meanwhile, although not illustrated in FIG. 7, the display device 180 according to an embodiment of the present disclosure can further include a first driver 234 configured to output the scan signal or the voltage of the first level LV1 to the plurality of first switching drivers RSS and a second driver 236 configured to output the voltage Sbb at the second level LVm to the plurality of second switching drivers CSS.

Here, the first driver 234 can correspond to the row driver 234 of FIG. 5, and the second driver 236 can correspond to the column driver 236 of FIG. 5.

FIGS. 8A to 9E are diagrams referred to in the description of FIG. 7.

Figure 8A:
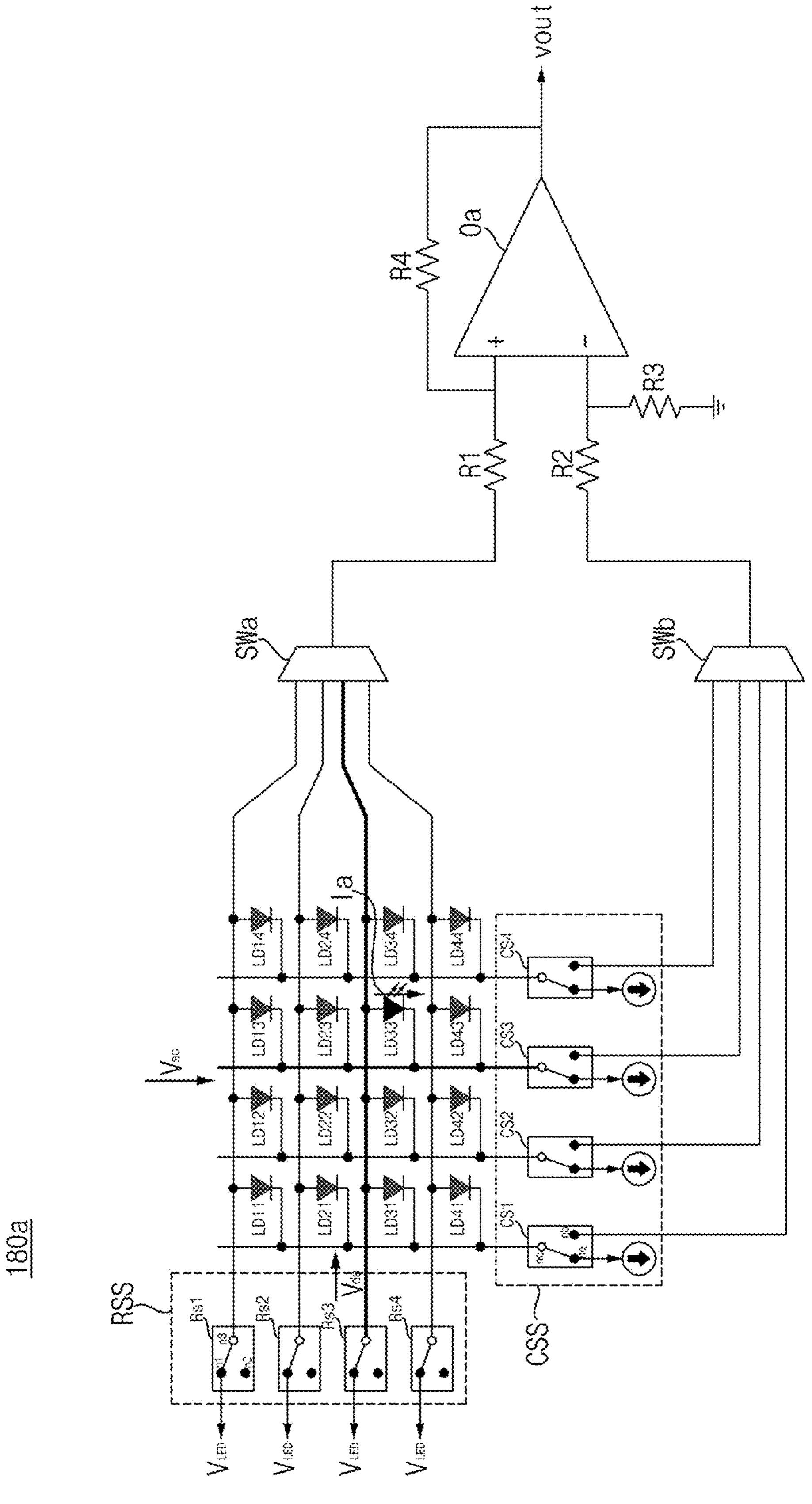
FIGS. 8A to 9E are diagrams referred to in the description of FIG. 7.

FIG. 8A is a diagram illustrating the operation of the display device 180*a* in the display mode.

During the display mode period, the scan signal or the voltage of the first level LV1 is sequentially applied for each of the row lines of the plurality of light emitting diodes LD11 to LD44.

To this end, during the display mode period, the first nodes n1 of the first switching drivers Rs1 to Rs4 are connected to the third nodes n3 to sequentially apply the scan signal or the voltage of the first level LV1 for each row line.

Alternatively, during the display mode period, the first nodes n1 of the first switching drivers Rs1 to Rs4 are sequentially connected to the third nodes n3 to sequentially apply the scan signal or the voltage of the first level LV1 for each row line.

Meanwhile, during the display mode period, the voltage of the second level LVm less than the first level LV1 is sequentially applied for each of the column lines of the plurality of light emitting diodes LD11 to LD44.

To this end, during the display mode period, the first nodes na of the second switching drivers Cs1 to Cs4 are connected to the third nodes nc to sequentially apply the voltage of the second level LVm for each column line.

Alternatively, during the display mode period, the first nodes na of the second switching drivers Cs1 to Cs4 are sequentially connected to the third nodes nc to sequentially apply the voltage of the second level LVm for each column line.

Accordingly, the light emitting diode emits light in such a manner that during the display mode period, the voltage of the first level LV1 is supplied to the anode of the light emitting diode, the voltage of the second level LVm is supplied to the cathode of the light emitting diode, and the forward current flows in the light emitting diode based on a voltage difference DFa between the first level LV1 and the second level LVm.

Particularly, as illustrated in FIG. 8A, the voltage of the first level LV1 is supplied to the anode of the light emitting diode LD33, the voltage of the second level LVM is supplied to the cathode of the light emitting diode LD33, and the forward current Ia flows in the light emitting diode LD33 based on the voltage difference DFa between the first level LV1 and the second level LVm, such that the light emitting diode LD33 can emit light.

Figure 8B:
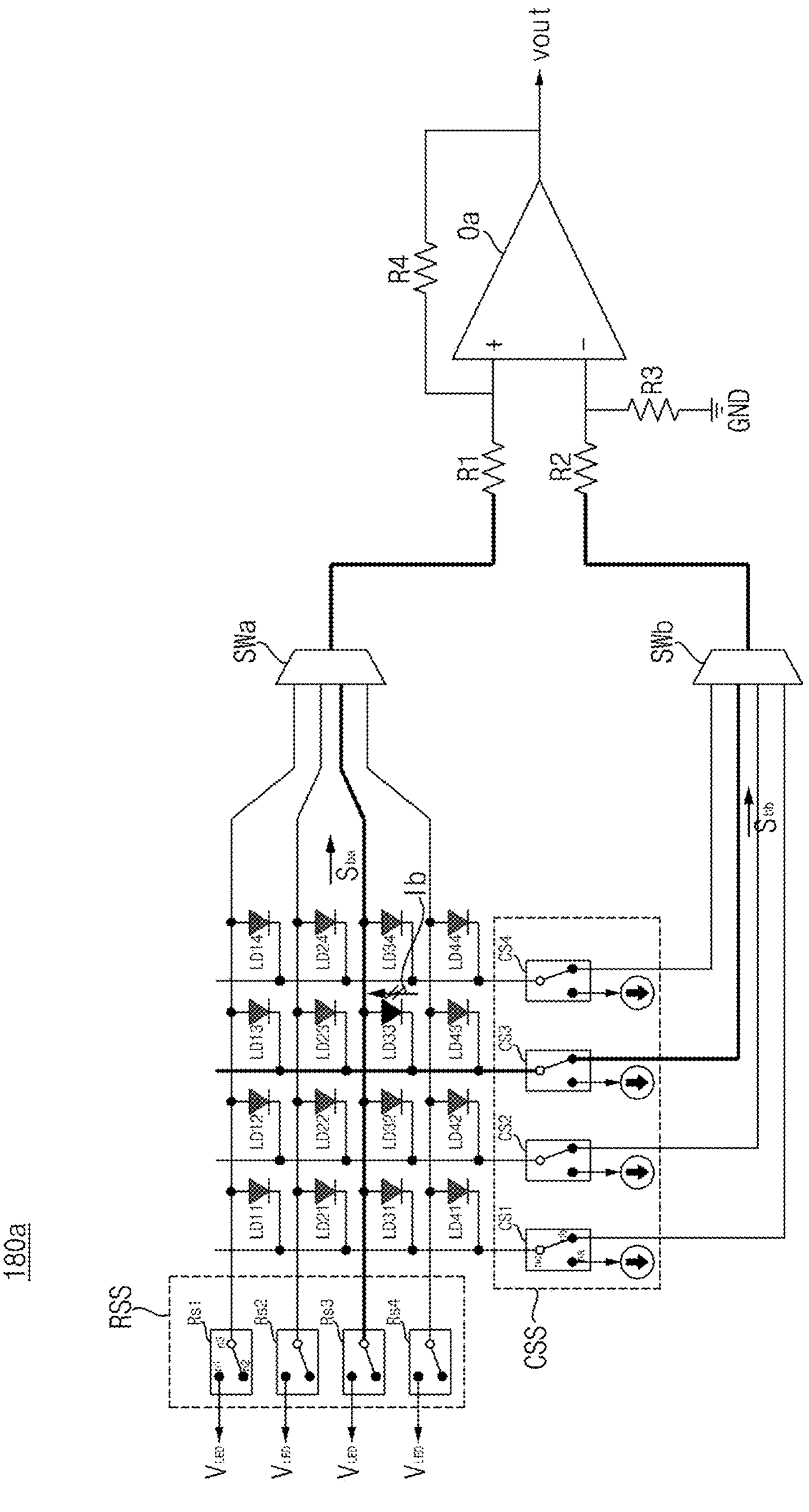

FIG. 8B is a diagram illustrating the operation of the display apparatus 180*a* in the sensing mode.

During the sensing mode period, the low level voltage at the level LVc can be applied to the row lines of the plurality of light emitting diodes LD11 to LD44.

To this end, during the sensing mode period, the second nodes n2 of the first switching drivers Rs1 to Rs4 are connected to the third nodes n3, such that the scan signal or the voltage of the first level LV1 is not applied, but the low level voltage at the level LVc can be applied for each row line.

Meanwhile, during the sensing mode period, the low level voltage at the level LVn can be applied to the column lines of the plurality of light emitting diodes LD11 to LD44. In this case, the level LVc and the level LVn can also be equal to each other.

To this end, during the sensing mode period, the second nodes nb of the second switching drivers Cs1 to Cs4 are connected to the third nodes nc, such that the voltage of the second level LV2 is not applied, but the low level voltage at the level LVn can be applied for each column line.

Accordingly, the forward current does not flow in the plurality of light emitting diodes LD11 to LD44 during the sensing mode period, such that the plurality of light emitting diodes LD11 to LD44 cannot emit light.

Meanwhile, the pointer light PL is incident on a specific light emitting diode location, e.g., light emitting diode LD33, during the sensing mode period, a cathode voltage of the light emitting diode LD33 increases with the amount of the pointer light PL, and thus becomes larger than an anode voltage.

Accordingly, the backward current I2 flows in the light emitting diode LD33, and the first line voltage LVc which is the anode voltage of the light emitting diode LD33 is supplied to the first switch SWa, and the second line voltage LVp which is the cathode voltage of the light emitting diode LD33 is supplied to the second switch SWb.

In addition, the amplifier Oa amplifies a difference DFb between the first line voltage LVc and the second line voltage LVp based on the current flowing in the light emitting diode LD33.

Accordingly, the coordinate information of the pointer light PL can be output based on the backward current flowing in the light emitting diode LD33 during the sensing mode period.

Figure 8C:
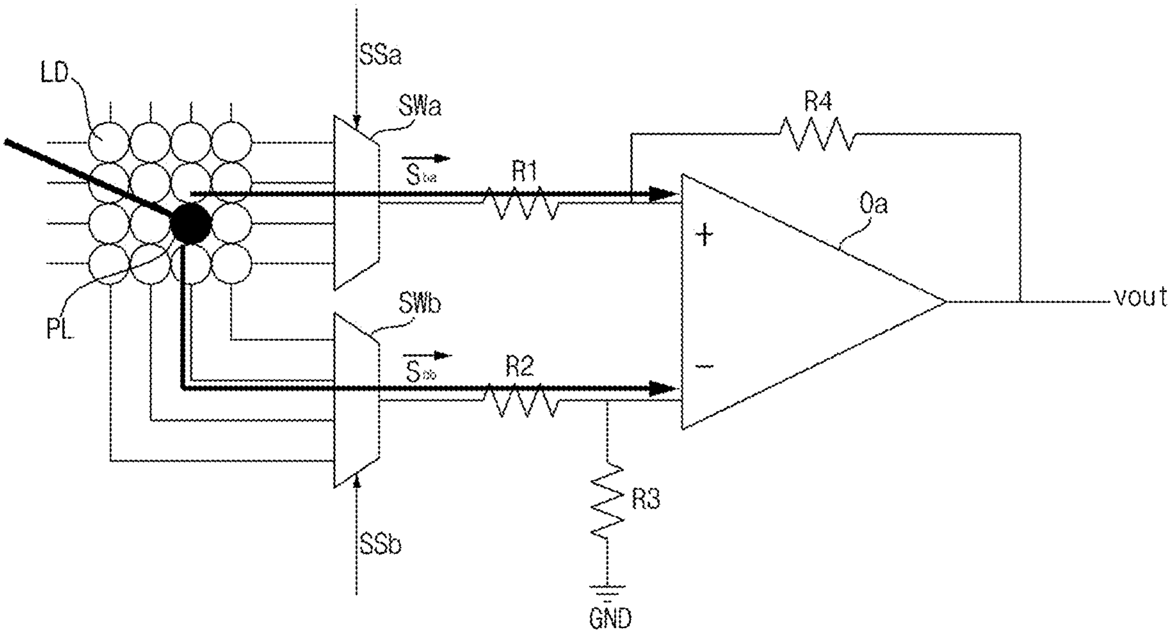

FIG. 8C is a diagram illustrating an amplification process based on the current flowing in the light emitting diode LD33 of FIG. 8B.

Referring to FIG. 8C, when the pointer light PL is incident on the light emitting diode LD33, the backward current I2 flows in the light emitting diode LD33 by the light amount of the pointer light PL, and a first line voltage Ssa which is an anode voltage of the light emitting diode LD33 is supplied to the first switch SWa, and a second line voltage Ssb which is a cathode voltage of the light emitting diode LD33 is supplied to the second switch SWb.

The amplifier Oa amplifies a difference DFb between the first line voltage LVc and the second line voltage LVp based on the current flowing in the light emitting diode LD33.

Meanwhile, the first switch SWa and a resistor element R1 are connected to a first input terminal of the amplifier Oa, and the second switch SWb, a resistor element R2, and a resistor element R3 are connected to a second input terminal of the amplifier Oa. The resistor element R2 and the resistor element R3 can be connected in parallel.

It is preferable that a resistor element R4 is connected between the first input terminal and an output terminal of the amplifier Oa, and a resistance value of the resistor element R4 is larger than resistance values of the resistor elements R1, R2, and R3.

Figure 8D:
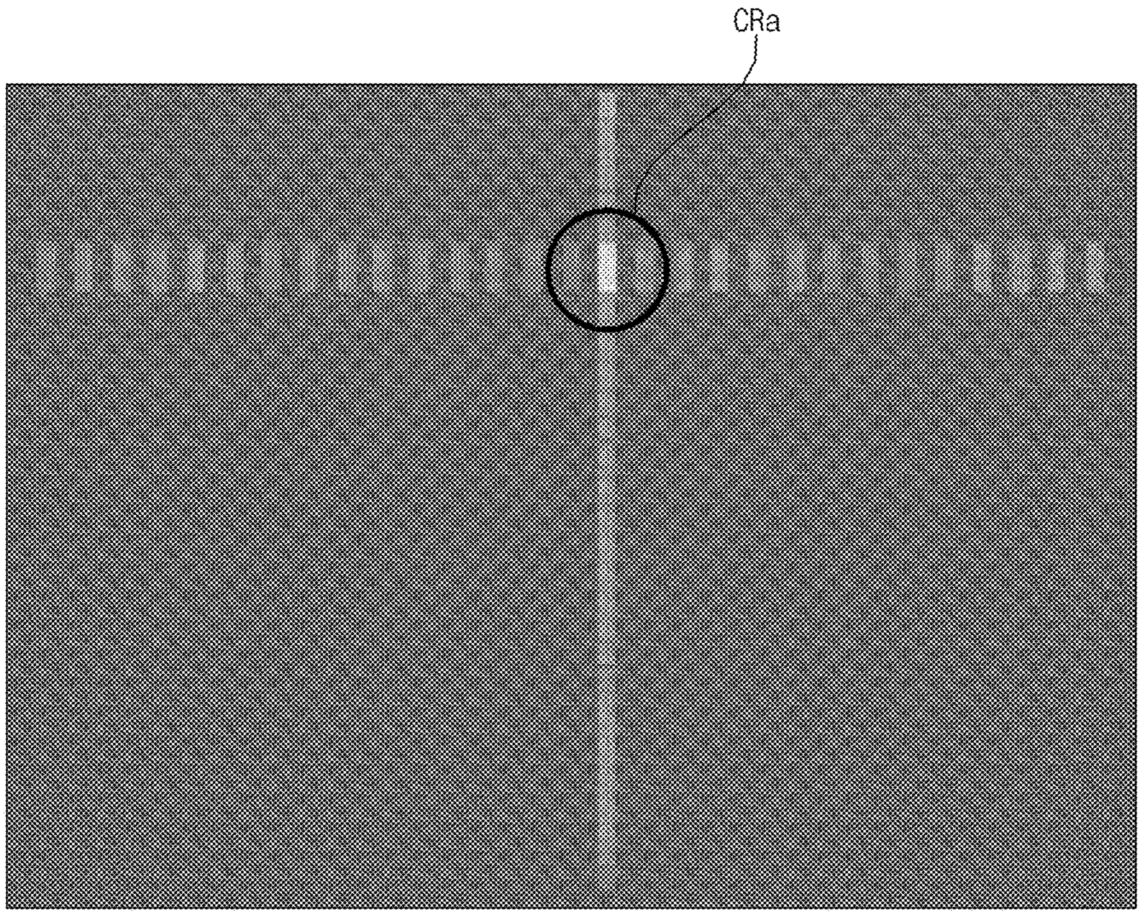

FIG. 8D is a diagram illustrating coordinate information of the pointer light PL.

Referring to FIG. 8D, the display device 180*a* can calculate coordinate information CRa of the pointer light PL based on an output of the amplifier Oa.

Figure 9A:
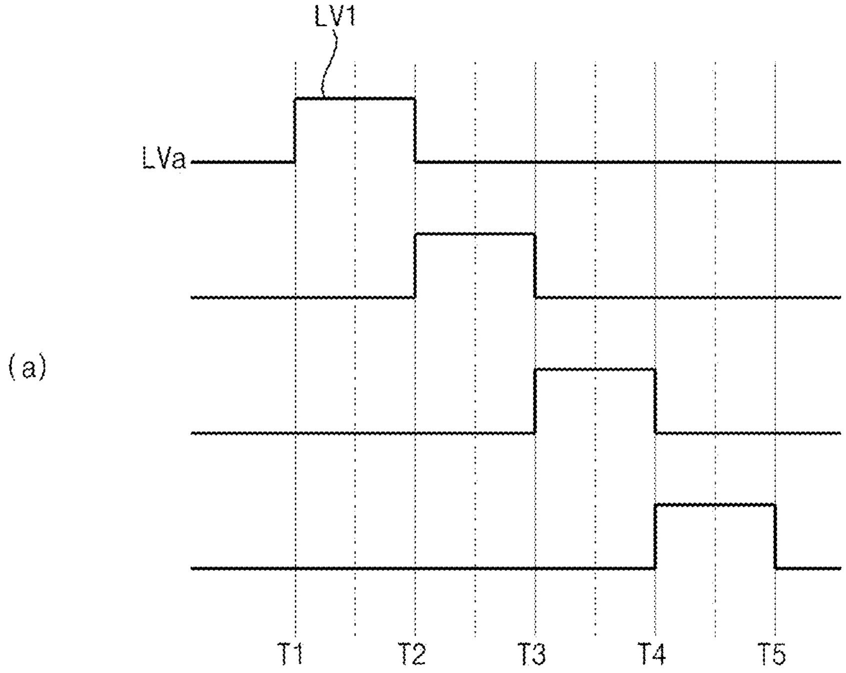
Figure 9A:
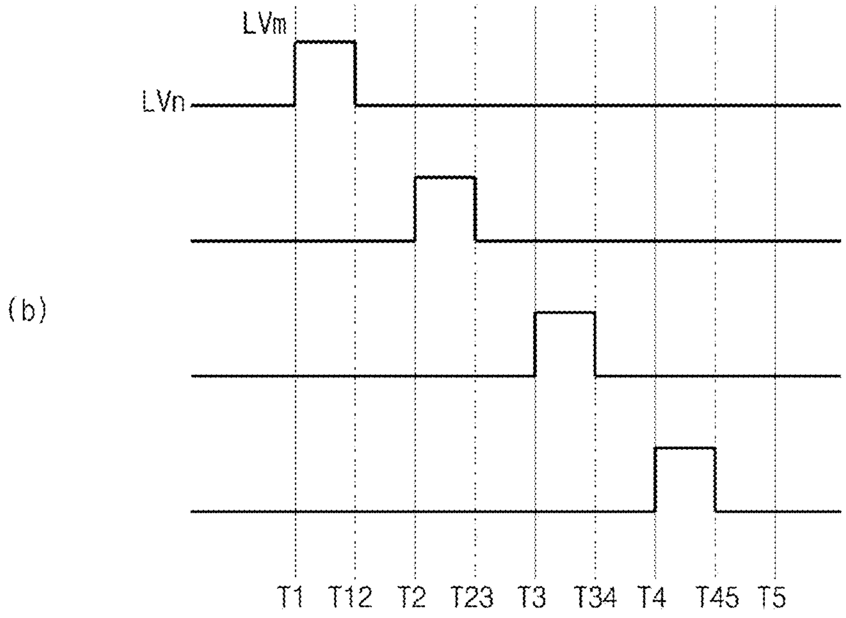

FIG. 9A is a diagram illustrating a scan signal at the first level LV1 during the display period, and the second level LVm.

Referring to FIG. 9A, during the display mode period, each of the first switching drivers Rs1 to Rs4 can be configured to sequentially output the scan signal at the first level LV1 for each row line as illustrated in (a) of FIG. 9A.

Accordingly, the scan signal at the first level LV1, which is a high level, is sequentially applied for each of the row lines of the plurality of light emitting diodes.

In the drawing, it is illustrated that the voltage of the first level LV1 is applied to the first row line during a period of T1 to T2, the voltage of the first level LV1 is applied to the second row line during a period of T2 to T3, the voltage of the first level LV1 is applied to the first row line during a period of T3 to T4, and the voltage of the first level LV1 is applied to the first row line during a period of T4 to T5.

Meanwhile, during the display mode period, each of the second switching drivers Cs1 to Cs4 can be configured to sequentially output the voltage of the second level LVm for each column line as illustrated in (b) of FIG. 9A.

Accordingly, the voltage of the second level LVm is sequentially applied for each of the column lines of the plurality of light emitting diodes.

In the drawing, it is illustrated that the voltage of the second level LVm is applied to the first column line during a period of T1 to T12, the voltage of the second level LVm is applied to the second column line during a period of T2 to T23, the voltage of the second level LVm is applied to the first column line during a period of T3 to T34, and the voltage of the second level LVm is applied to the first column line during a period of T4 to T45.

Meanwhile, unlike the drawing, it is also possible that the voltage of the second level LVm is applied to the first column line during the period of T1 to T2, the voltage of the second level LVm is applied to the second column line during the period of T2 to T3, the voltage of the second level LVm is applied to the first column line during the period of T3 to T4, and the voltage of the second level LVm is applied to the first column line during the period of T4 to T5.

Meanwhile, unlike the drawing, it is also possible that the voltage of the second level LVm is applied to the first column line during a period of T12 to T2, the voltage of the second level LVm is applied to the second column line during a period of T23 to T3, the voltage of the second level LVm is applied to the first column line during a period of T34 to T4, and the voltage of the second level LVm is applied to the first column line during a period of T45 to T5.

Figure 9B:
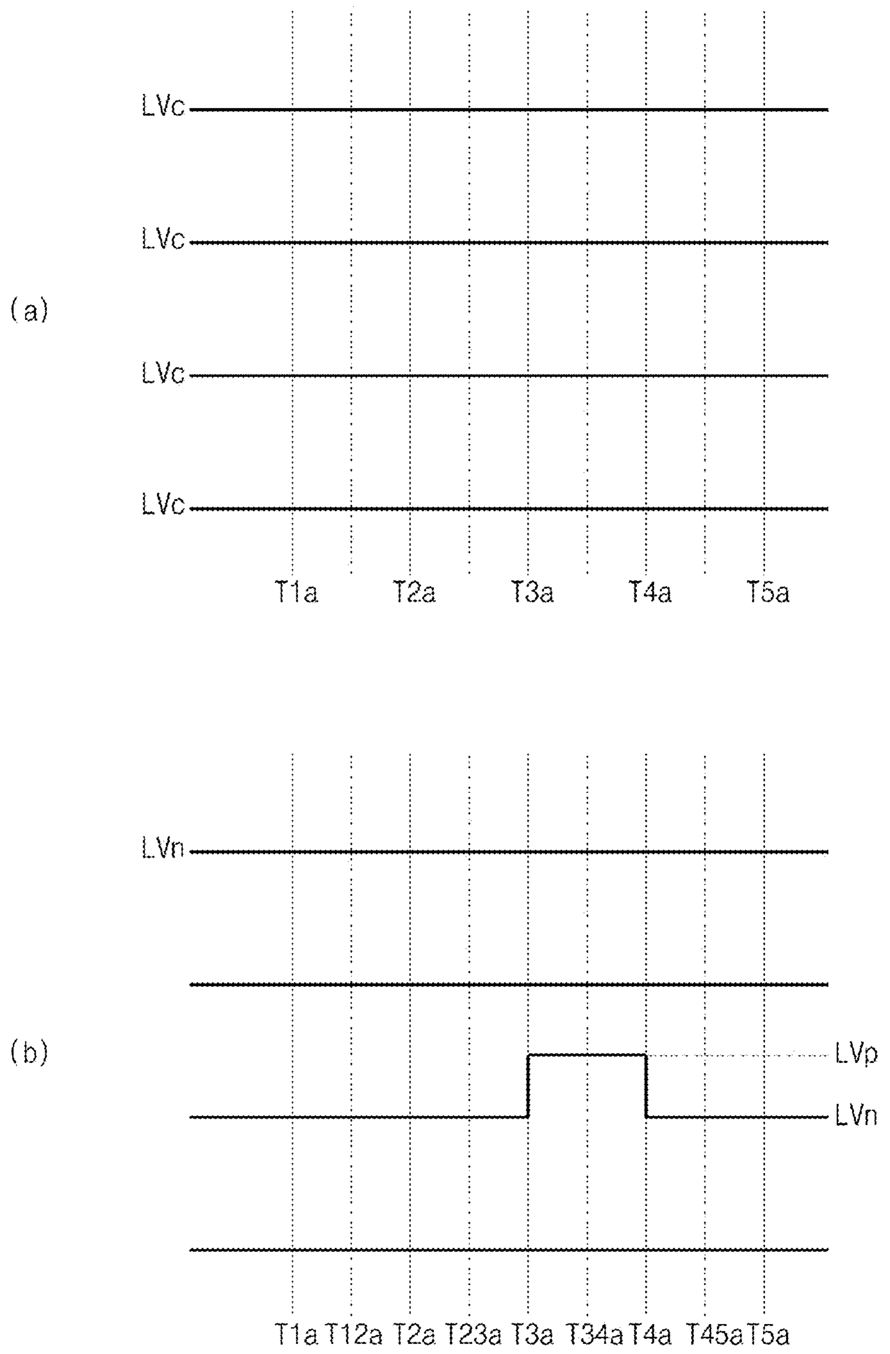

FIG. 9B is a diagram illustrating the voltage at the low level LVc supplied to the row line and the voltage at the low level LVn supplied to the column line during a scan mode period.

Referring to FIG. 9B, during the scan mode period, each of the first switching drivers Rs1 to Rs4 can be configured to sequentially output the voltage at the low level LVc to the row line as illustrated in (a) of FIG. 9B.

In the drawing, it is illustrated that the voltage at the low level LVc is output to the row line during a period of T1*a* to T5*a*.

Meanwhile, during the scan mode period, each of the second switching drivers Cs1 to Cs4 can be configured to output the voltage at the low level LVn to the column line as illustrated in (b) FIG. 9B.

In the drawing, it is illustrated that the voltage at the low level LVn is output to the column line during a period of T1*a* to T5*a*.

In this case, when the pointer light PL is incident on the light emitting diode LD33, the cathode voltage of the light emitting diode LD33 increases with the amount of the pointer light PL, and thus becomes larger than an anode voltage.

Accordingly, as illustrated in (b) FIG. 9B, a voltage at the level LVp which is larger than the low level LVn is applied to the cathode of the light emitting diode LD33 during the period of T3*a* to T4*a*.

Figure 9C:
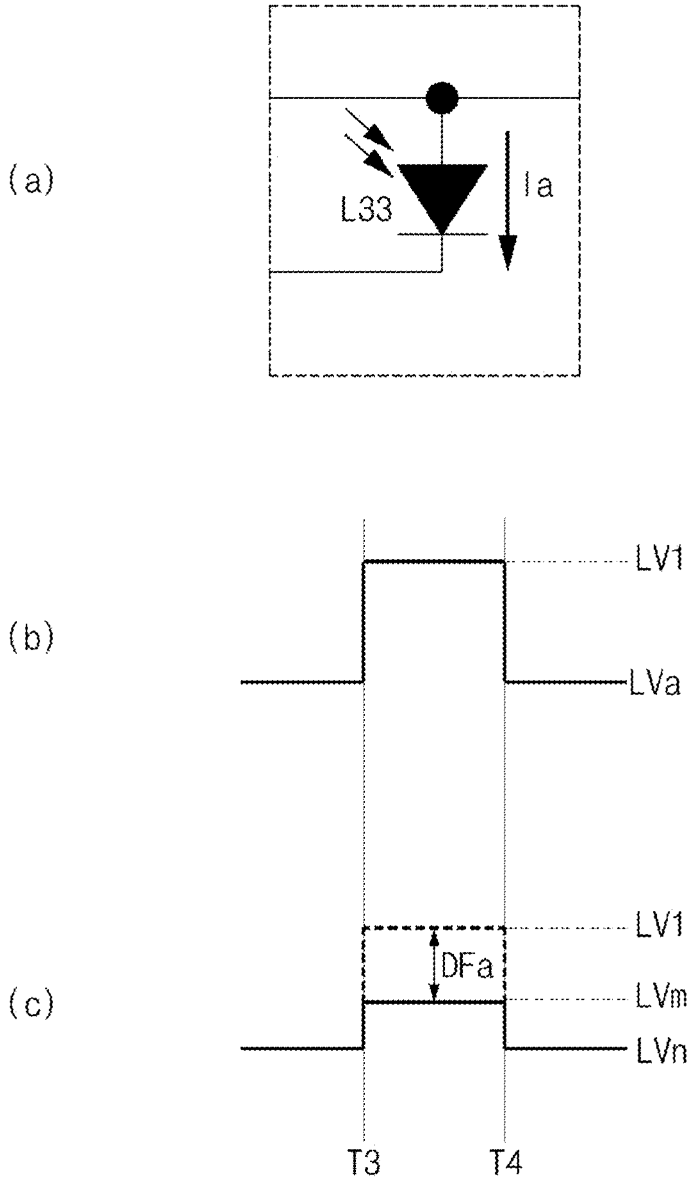

FIG. 9C is a diagram illustrating an example in which the light emitting diode LD33 emits light during the display mode period of FIG. 9A.

Referring to FIG. 9C, during the display mode period, the scan signal or the voltage of the first level LV1 is applied to the anode of the light emitting diode LD33 as illustrated in (b) of FIG. 9C, the voltage of the second level LVm is supplied to the cathode of the light emitting diode as illustrated in (c) of FIG. 9C, and the forward current Ia flows in the light emitting diode LD33 based on the voltage difference DFa between the first level LV1 and the second level LVm as illustrated in (a) of FIG. 9C, such that the light emitting diode LD33 can be configured to emit light.

Figure 9D:
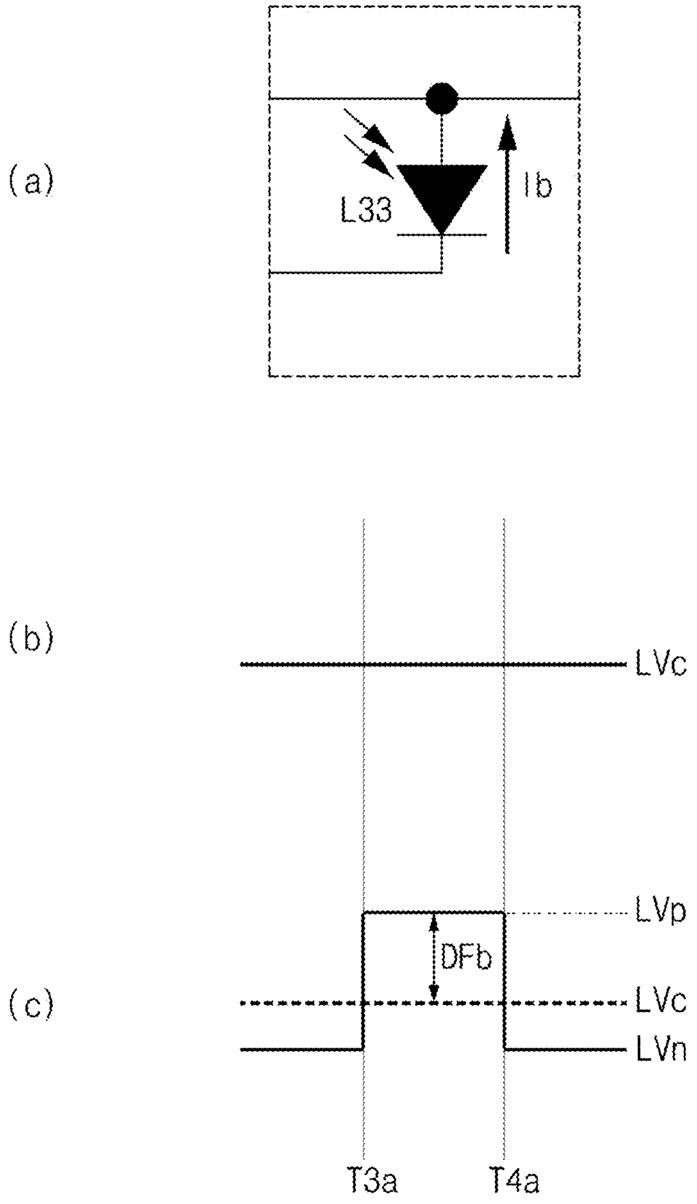

FIG. 9D is a diagram illustrating an example in which the backward current flows in the light emitting diode LD33 during the sensing mode period of FIG. 9B.

Referring to FIG. 9D, during the display mode period as illustrated in (b) of FIG. 9D, the voltage at the low level LVc is applied to the anode of the light emitting diode LD33 and the voltage at the high level LVp other than the voltage at the low level LVn is applied to the cathode of the light emitting diode when the pointer light PL is incident thereon, and the backward current Ib flows in the light emitting diode LD33 based on the difference DFb between the low level voltage LVc and the high-level voltage LVp, which is the difference DFb between the first line voltage LVc and the second line voltage LVp, as illustrated in (a) of FIG. 9D.

Accordingly, the first line voltage LVc is supplied to the first switch SWa and the second line voltage LVp which is the cathode voltage of the light emitting diode LD33 is supplied to the second switch SW to calculate the coordinate information of the pointer light PL.

Figure 9E:
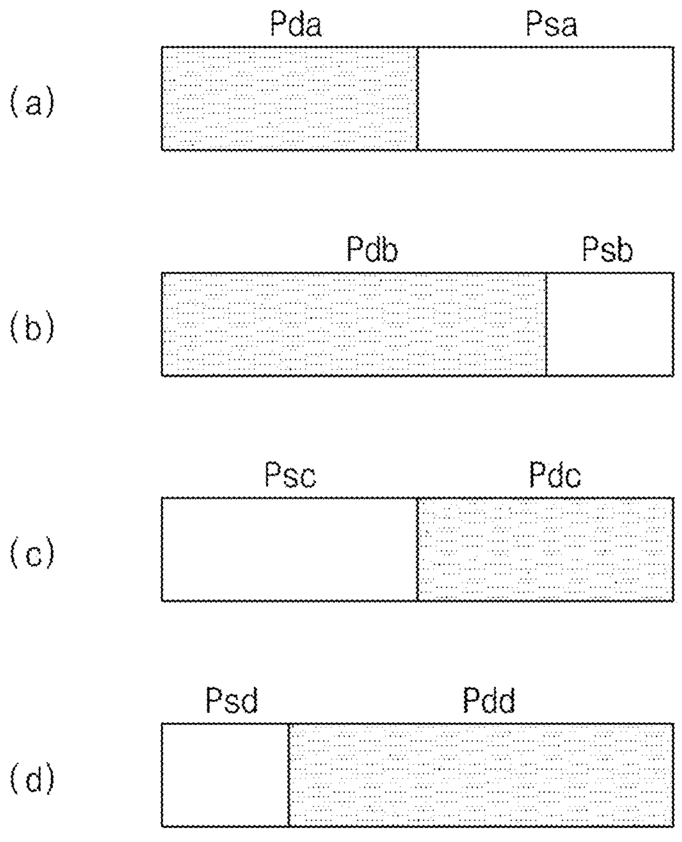

FIG. 9E is a diagram illustrating an example of setting various periods in the display mode and the sensing mode.

The timing controller 232 can be configured to control the display mode period and the sensing mode period.

For example, the timing controller 232 can be configured to perform the sensing mode period after the display mode period is performed.

In another example, the timing controller 232 can be configured to perform the display mode period after the sensing mode period is performed.

Meanwhile, the timing controller 232 can be configured to perform change the display mode period and the sensing mode period.

For example, the timing controller 232 can be configured to control the sensing mode period and the display mode period to be equal to each other.

In another example, the timing controller 232 can be configured to control the display mode period to be longer than the sensing mode period.

In yet another example, the timing controller 232 can be configured to control the display mode period to be shorter than the sensing mode period.

In FIG. 9E, (a) illustrates an example in which the sensing mode period Psa is performed after the display mode period Pda, and the display mode period Pda and the sensing mode period Psa are equal to each other.

Referring to the drawing, a current Ia in a first direction can flow in at least some of the plurality of light emitting diodes LD11 to LD44 during the display mode period Pda, and a current Ib in a second direction opposite to the first direction can flow in at least some of the plurality of light emitting diodes LD11 to LD44 during the sensing mode period Psa. Accordingly, the light emitting diode can emit light based on the current in the first direction during the display mode period Pda and the pointer light PL can be stably sensed without a separate optical sensor based on the current in the second direction, which is the reverse direction, during the sensing mode period Psa.

Meanwhile, in response to a difference DFa between the voltage Sba at the first level LV1 and the voltage Sbb at the second level LVm, the current Ia in the first direction can flow in at least some of the plurality of light emitting diodes LD11 to LD44 during the display mode period Pda and the current Ib in the second direction opposite to the first direction can flow in at least some of the plurality of light emitting diodes LD11 to LD44 during the sensing mode period Psa. Accordingly, the pointer light PL can be stably sensed without a separate optical sensor during the sensing mode period Psa.

Meanwhile, the anode voltage of the light emitting diode, on which the pointer light PL is incident, is lower in the sensing mode period Psa than in the display mode period Pda, and the cathode voltage of the light emitting diode, on which the pointer light PL is incident, is greater in the sensing mode period Psa than in the display mode period Pda. Accordingly, the pointer light PL can be stably sensed without a separate optical sensor during the sensing mode period Psa.

Meanwhile, the sensing controller 510 can be configured to sequentially drive the first plurality of switching drivers RSS and the plurality of second switching drivers CSS during the sensing mode period Psa, and the sensing interface 239 can be configured to output coordinate information Sse of the pointer light based on sequential driving of the plurality of first switching drivers RSS and the plurality of second switching drivers CSS. Accordingly, the coordinate information Sse of the pointer light corresponding to the sensed pointer light PL can be stably output.

Meanwhile, the sensing interface 239 can be configured to output intensity information of the pointer light corresponding to a level of the difference DFb between the first line voltage LVc and the second line voltage LVp. Accordingly, intensity information of the pointer light corresponding to the sensed pointer light PL can be stably output.

Meanwhile, the plurality of second switching drivers CSS output the voltage Sbb at the second level LVm during the display mode period Pda and do not output the voltage Sbb at the second level LVm during the sensing mode period Psa. Accordingly, the pointer light PL can be stably sensed without a separate optical sensor during the sensing mode period Psa.

In FIG. 9E, (b) illustrates an example in which the sensing mode period Psb is performed after the display mode period Pdb, and the display mode period Pdb is longer than the sensing mode period Psb.

In FIG. 9E, (c) illustrates an example in which the display mode period Pdc is performed after the sensing mode period Psc, and the sensing mode period Psc and the display mode period Pdc are equal to each other.

In FIG. 9E, (d) illustrates an example in which the display mode period Pdd is performed after the sensing mode period Psd, and the sensing mode period Psd is shorter than the display mode period Pdd.

Meanwhile, in the case in which pointing coordinate information corresponding to the pointer light PL is not detected during the sensing mode period, the timing controller 232 can be configured to control the display mode period to be longer than the sensing mode period.

For example, in the case in which the pointing coordinate information corresponding to the pointer light PL is not detected during the sensing mode period Psa when the display mode period Pda and the sensing mode period Psa are equal to each other as illustrated in (a) of FIG. 9E, the timing controller 232 can be configured to control the display mode period Pdb to be longer than the sensing mode period Psb as illustrated in (b) of FIG. 9E. Accordingly, the sensing mode period can be flexibly controlled.

Meanwhile, in the case in which the pointing coordinate information corresponding to the pointer light PL is detected during the sensing mode period, the timing controller 232 can be configured to control the display mode period to be equal to or shorter than the sensing mode period.

For example, in the case in which the pointing coordinate information corresponding to the pointer light PL is detected when the display mode period Pdb is longer than the sensing mode period Psb as illustrated in (b) of FIG. 9E, the timing controller 232 can be configured to control the display mode period Pda and the sensing mode period Psa to be equal to each other or the sensing mode period to be longer as illustrated in (a) of FIG. 9E. Accordingly, the sensing mode period can be flexibly controlled.

Meanwhile, when the display mode period is shorter than the sensing mode period, the timing controller 232 can be configured to increase the level of the scan signal or the first level LV1 or decrease the second level LVm.

That is, the timing controller 232 can be configured to increase a difference between the first level and the second level as the display mode period becomes shorter than the sensing mode period. Accordingly, luminance attenuation of the display mode period that becomes shorter can be compensated for by using an increasing difference between the levels.

Figure 10A:
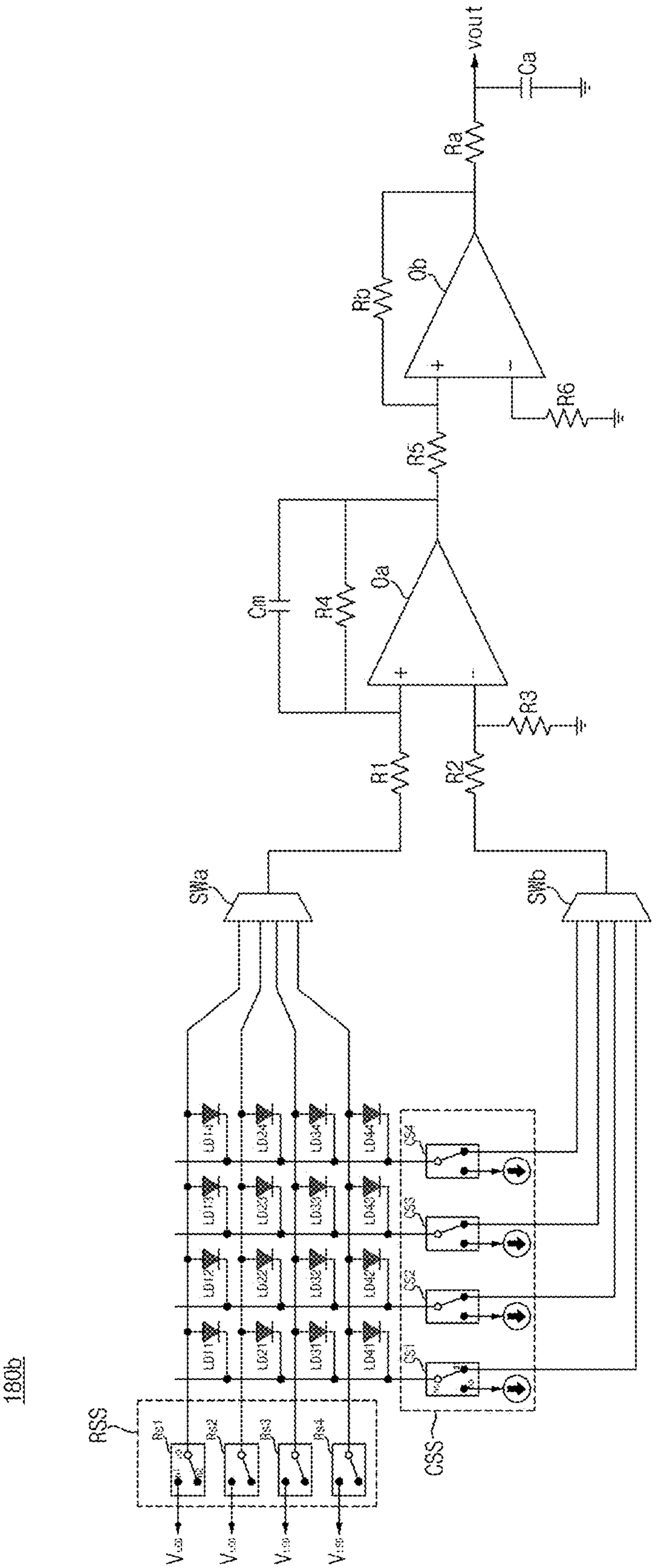
FIG. 10A is an exemplary internal circuit diagram of a display device according to another embodiment of the present disclosure.

FIG. 10A is an exemplary internal circuit diagram of a display device according to another embodiment of the present disclosure.

Referring to FIG. 10A, a display device 100*b* according to another embodiment of the present disclosure includes: a plurality of light emitting diodes LD11 to LD44 arranged in a matrix form; a plurality of first switching drivers RSS configured to supply a scan signal or a voltage of a first level LV1 to anodes of the plurality of light emitting diodes LD11 to LD44 for each first line based on a switching operation during a display mode period Pda; a plurality of second switching drivers CSS configured to supply a voltage Sbb at a second level LVm, less than the first level LV1, to cathodes of the plurality of light emitting diodes LD11 to LD44 for each second line based on the switching operation during the display mode period Pda; a first switch SWa configured to output the scan signal or the voltage of the first level LV1 during the display mode period Pda and not output the scan signal or the voltage of the first level LV1 during a sensing mode period Psa separate from the display mode period Pda; a second switch SWb configured to output the voltage Sbb at the second level LVm during the display mode period Pda and output a current flowing in at least one of the plurality of light emitting diodes LD11 to LD44 based on a pointer light PL during the sensing mode period Psa; and multi-stage amplifiers Oa and OPb configured to amplify a difference DFb between a first line voltage LVc and a second line voltage LVp based on the current flowing in the light emitting diode during the sensing mode period Psa.

That is, the display device 180*b* of FIG. 10A is similar to the display device 180*a* of FIG. 7, with a difference being that the display device 180*b* includes the multi-stage amplifiers Oa and OPb.

The following description will focus on the difference, in which the display device 180*b* of FIG. 10A can further include a resistor element Ra and a capacitor element Ca at output terminals of the multi-stage amplifiers Oa and OPb. Accordingly, the pointer light PL can be stably sensed without a separate optical sensor during the sensing mode period based on a signal from which noise is removed.

The first switch SWa and a resistor element R1 are connected to a first input terminal of a first stage amplifier Oa of the multi-stage amplifiers Oa and OPb, and the second switch SWb, a resistor element R2, and a resistor element R3 are connected to a second input terminal of the first stage amplifier Oa.

A resistor element R4 and a capacitor element Cm are connected in parallel between the first input terminal and the output terminal of the first-storage amplifier Oa, a resistor element R5 is connected between the output terminal of the first stage amplifier Oa and a first input terminal of a second-stage amplifier Ob, and a resistor element R6 is connected to a second input terminal of the second-stage amplifier Ob.

The resistor element Rb is connected between the first input terminal and the output terminal of the second-stage amplifier Ob, and the resistor element Ra and the capacitor element Ca are connected to the output terminal of the second-stage amplifier Ob.

The difference DFb between the first line voltage LVc and the second line voltage LVp input into the multi-stage amplifiers Oa and OPb is amplified through the multi-stage amplifiers Oa and OPb, and noise is removed through the resistor element Ra and the capacitor element Ca.

Accordingly, the multi-stage amplifiers Oa and OPb can be configured to output a signal with reduced noise by the resistor element Ra and the capacitor element Ca connected to the output terminal of the multi-stage amplifier Oa. Accordingly, the pointer light PL can be stably sensed without a separate optical sensor during the sensing mode period based on the signal from which noise is removed.

Meanwhile, a resistance value of the resistor element R4 connected to the first stage amplifier Oa is preferably larger than a resistance value of the resistor element Rb connected to the second-stage amplifier Ob after the first stage amplifier Oa. Accordingly, the pointer light PL can be stably sensed without a separate optical sensor during the sensing mode period based on the signal from which noise is removed.

Figure 10B:
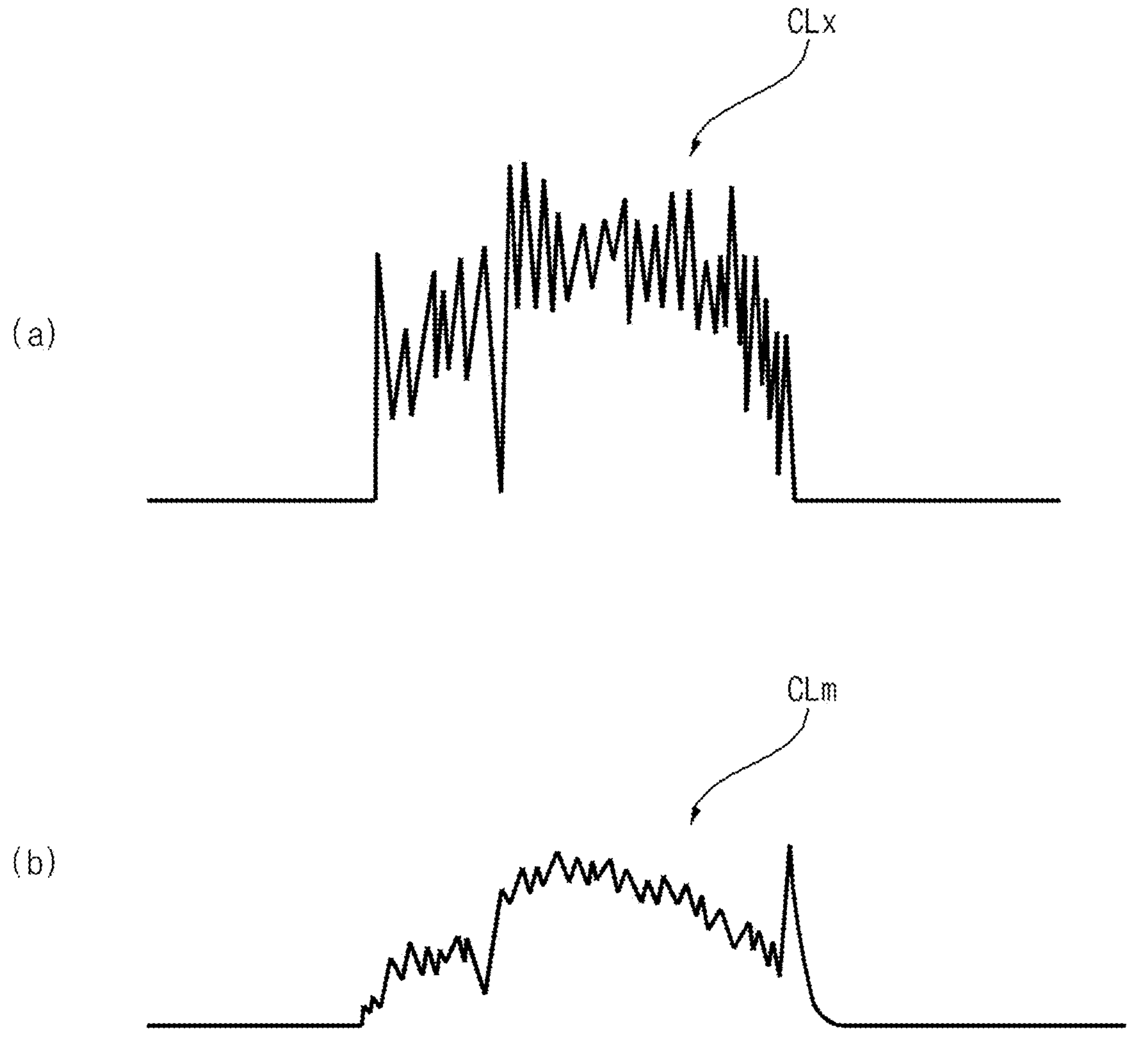
FIG. 10B is a diagram referred to in the description of FIG. 10A.

FIG. 10B is a diagram referred to in the description of FIG. 10A.

In FIG. 10B, (a) illustrates a difference CLx between the first line voltage LVc and the second line voltage LVp input into the input terminals of the multi-stage amplifiers Oa and OPb.

In FIG. 10B, (b) illustrates a signal Clm from which noise is removed through the resistor element Ra and the capacitor element Ca of the multi-stage amplifiers Oa and OPb. Accordingly, the pointer light PL can be stably sensed without a separate optical sensor during the sensing mode period based on the signal from which noise is removed.

Figure 11:
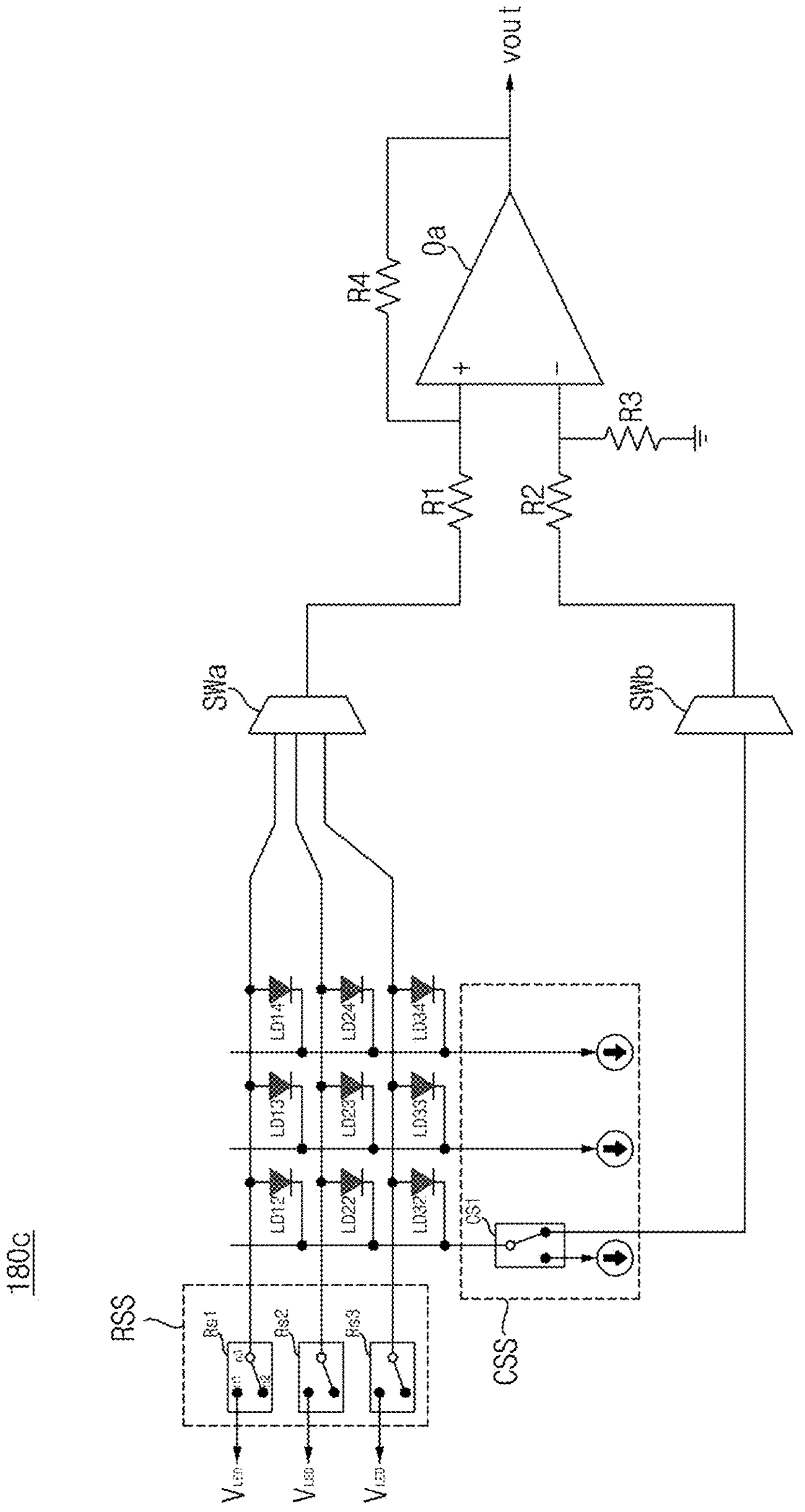
FIG. 11 is an exemplary internal circuit diagram of a display device according to yet another embodiment of the present disclosure.

FIG. 11 is an exemplary internal circuit diagram of a display device according to yet another embodiment of the present disclosure.

A display device 100*c* according to yet another embodiment of the present disclosure includes: a plurality of light emitting diodes LD11 to LD33 arranged in a matrix form; a plurality of first switching drivers RSS configured to supply a scan signal or a voltage of a first level LV1 to anodes of the plurality of light emitting diodes LD11 to LD33 for each first line based on a switching operation during a display mode period Pda; a second switching driver CSS configured to supply a voltage Sbb at a second level LVm, less than the first level LV1, to cathodes of the plurality of light emitting diodes LD11 to LD33 for each second line based on the switching operation during the display mode period Pda; a first switch SWa configured to output the scan signal or the voltage of the first level LV1 during the display mode period Pda and not output the scan signal or the voltage of the first level LV1 during a sensing mode period Psa separate from the display mode period Pda; a second switch SWb configured to output the voltage Sbb at the second level LVm during the display mode period Pda and output a current flowing in at least one of the plurality of light emitting diodes LD11 to LD33 based on a pointer light PL during the sensing mode period Psa; and an amplifier Oa configured to amplify a difference DFb between a first line voltage LVc and a second line voltage LVp based on the current flowing in the light emitting diode during the sensing mode period Psa.

Light emitting diodes L11, L21, and L31 of a first column line among the plurality of light emitting diodes LD11 to LD33 can be red light emitting diodes, light emitting diodes LD12, LD22, and LD32 of a second column line can be green light emitting diodes, and Light emitting diodes LD13, LD23, and LD33 of a third column line can be blue light emitting diodes.

In a display mode, an operation is preferably performed so that the light emitting diodes L11, L21, and L31 of the first column line which are red light emitting diodes can emit red light, and the light emitting diodes LD12, LD22, and LD32 of the second column line which are green light emitting diodes can emit green light, and the light emitting diodes LD13, LD23, and LD33 of the third column line which are blue light emitting diodes can emit blue light.

Meanwhile, since the red light emitting diode shows more excellent photoelectric conversion efficiency upon incidence of the pointer light than the red and blue light emitting diodes, it is also possible to perform a sensing mode only in the red light emitting diode.

Accordingly, the second switching driver CSS can include one switching driver Css1 for the red light emitting diode, rather than three switching drivers.

In addition, a second node nb of one switching driver Css1 connected to the light emitting diodes L11, L21, and L31 of the first column line is connected to the second switch SWb.

Accordingly, the number of switching drivers can be reduced as compared with the display apparatus 180*a* of FIG. 7.

FIGS. 12A to 12E are diagrams referred to in the description of an image display apparatus according to an embodiment of the present disclosure.

Figure 12A:
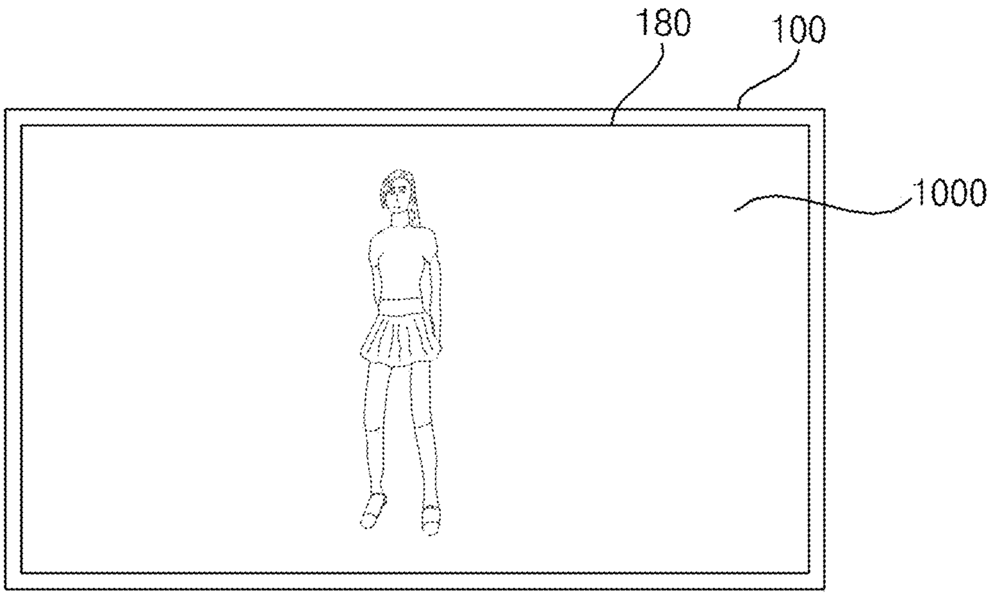
FIGS. 12A to 12E are diagrams referred to in the description of an image display apparatus according to an embodiment of the present disclosure.

FIG. 12A illustrates an example in which an image 1000 is displayed on the display device 180 of the image display apparatus 100.

The signal processing device 170 outputs an image signal to the display device 180, and thus, the image 1000 can be displayed as illustrated in FIG. 12A.

Figure 12B:
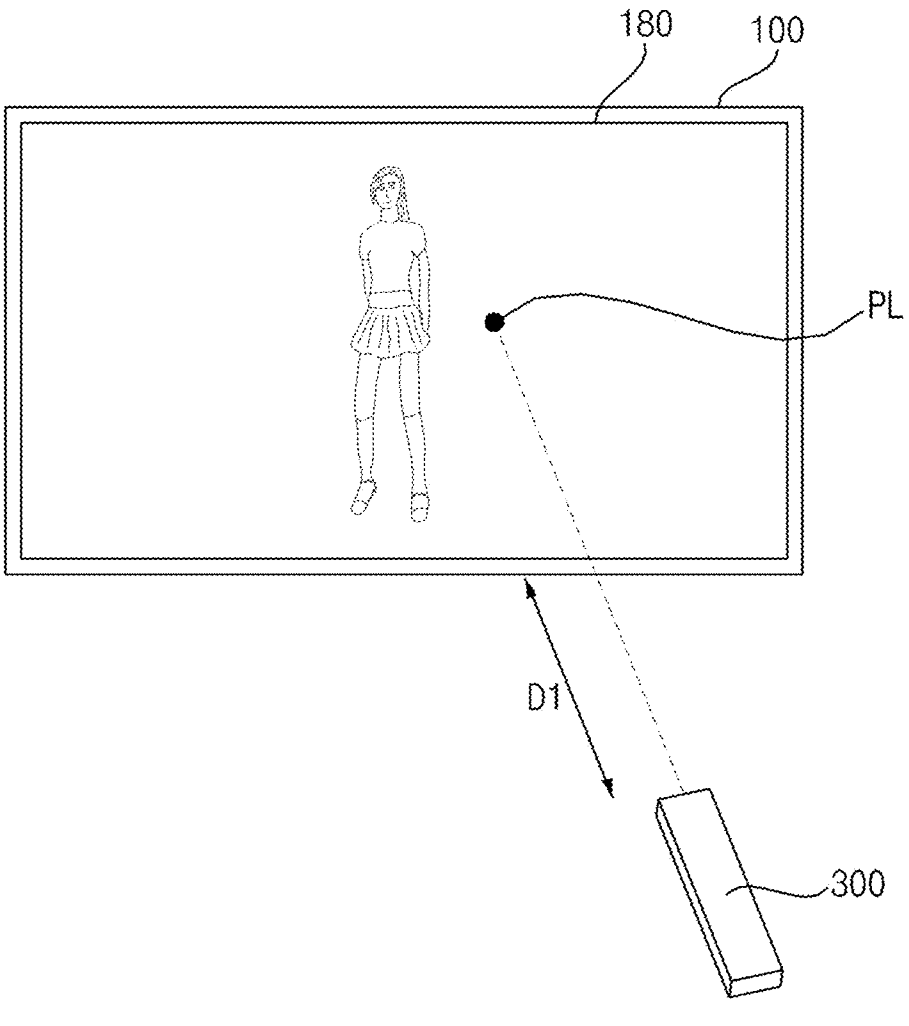

FIG. 12B illustrates an example in which a pointer light PL from a pointing device 300 spaced at a first distance D1 is incident on the display device 180 during image display.

In this case, the pointer light PL can be laser light.

As described above, during the display mode period, the image 1000 is displayed as light is emitted by using the forward current of the plurality of light emitting diodes, and during the sensing mode period, when the pointer light PL is incident on some of the plurality of light emitting diodes, pointing coordinates are sensed by using the backward current of the corresponding light emitting diode.

Accordingly, the signal processing device 170 can be configured to receive coordinate information of the pointer light PL from the display device 180 and output an image signal including a pointer image 201 to the display device 180 based on the coordinate information of the pointer light PL from the display device 180.

Figure 12C:
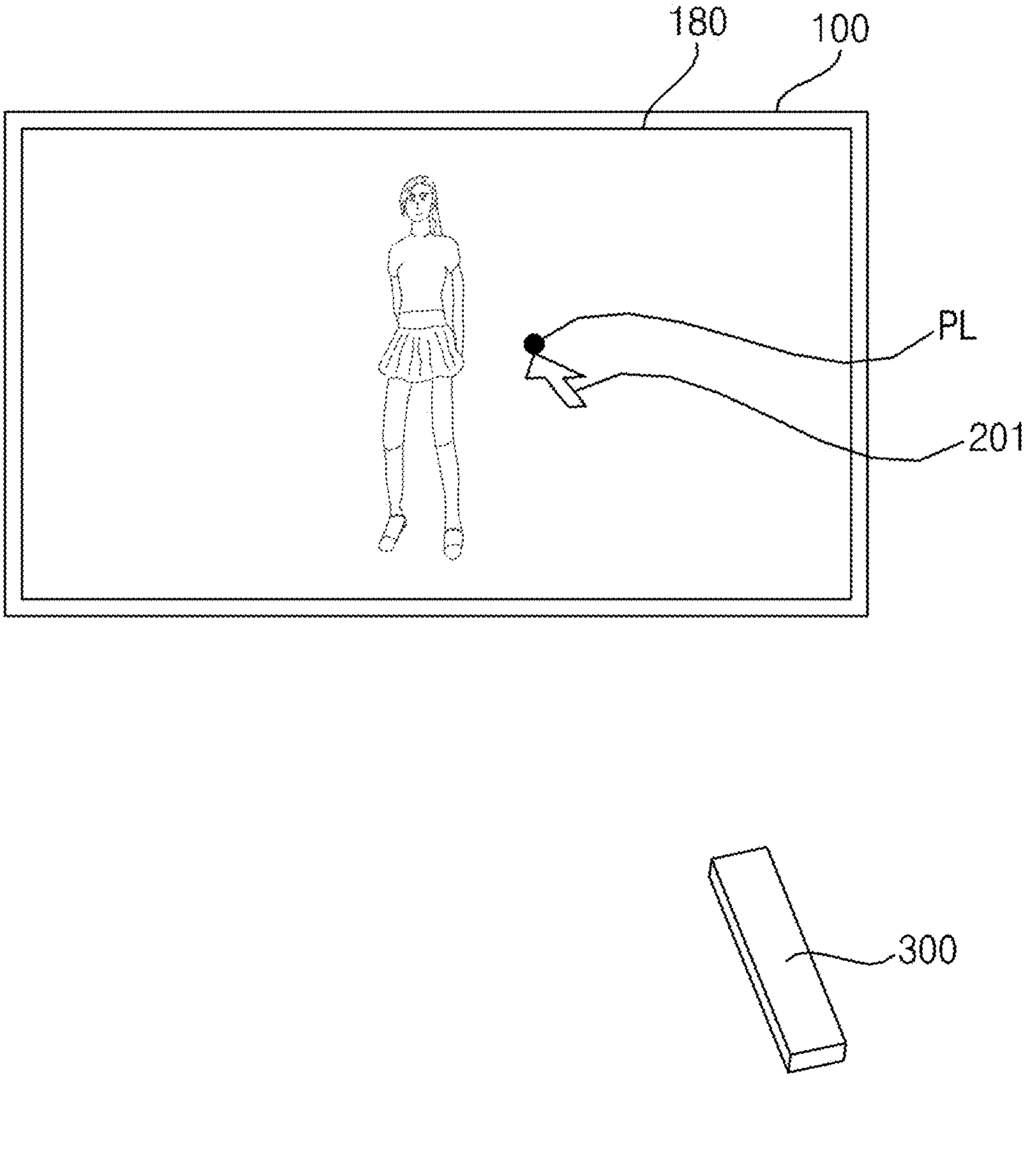

FIG. 12C is a diagram illustrating an example in which the pointer image 201 is displayed based on the coordinate information of the pointer light PL from the display device 180 when the image 1000 is displayed.

Figure 12D:
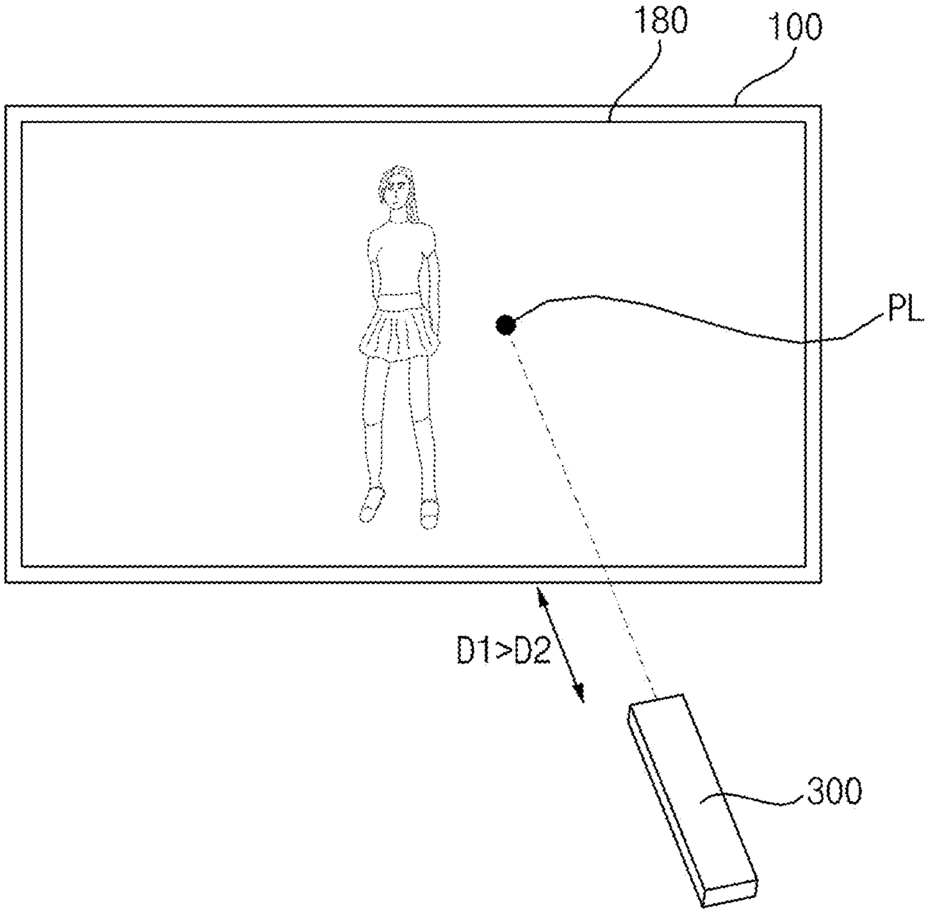

FIG. 12D is a diagram illustrating an example in which the pointer light PL from the pointing device 300 spaced at a second distance D2 shorter than the first distance D1 is incident on the display device 180 during image display.

When the pointer light PL is incident from the pointing device 300 spaced at the second distance D2 shorter than the first distance D1, a difference DFb between a first line voltage LV2 and a second line voltage LVp further increases in the sensing mode.

Based on the difference, the display device 180 can be configured to transmit intensity information of the pointer light PL to the signal processing device 170.

Accordingly, the signal processing device 170 can be configured to output an image signal including a pointer image 201, of which size or brightness is changed, to the display device 180 based on the intensity information of the pointer light PL from the display device 180.

Figure 12E:
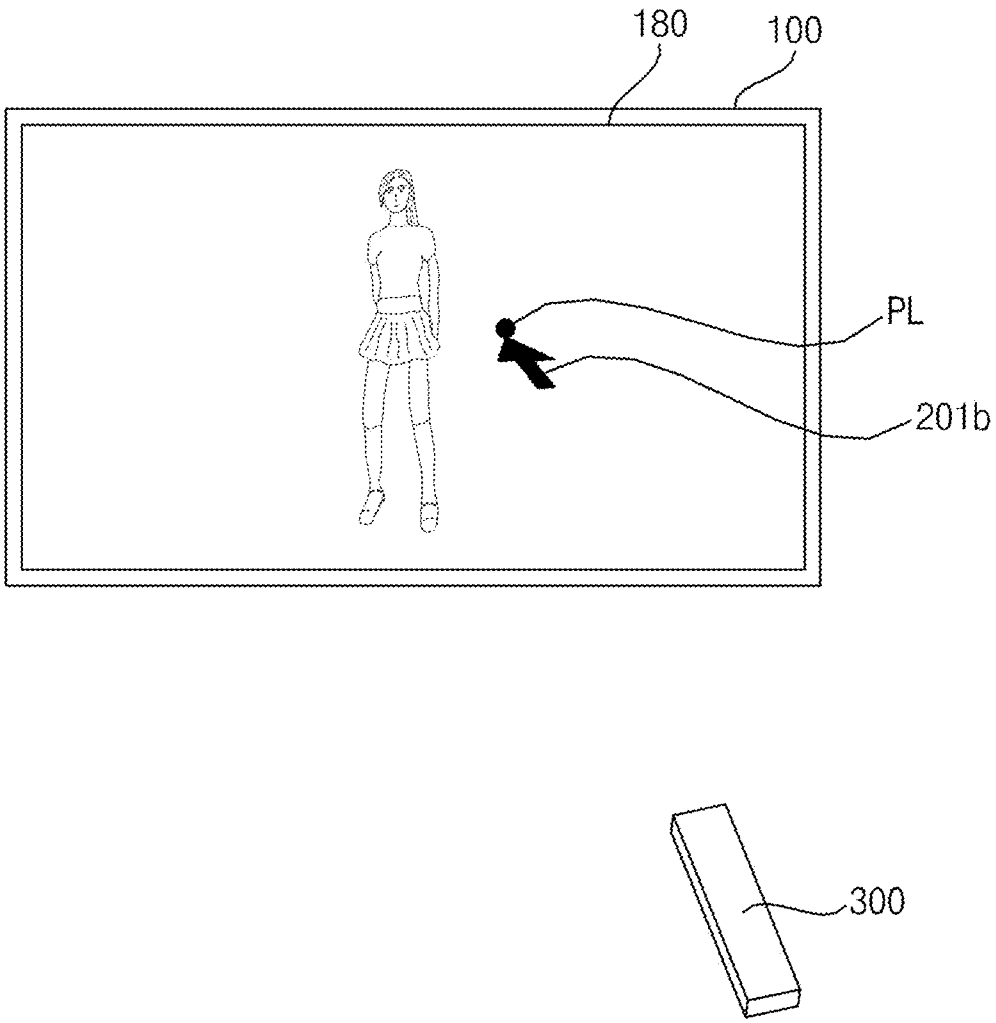

FIG. 12E illustrates an example in which a pointer image 201*b* is displayed based on the coordinate information of the pointer light PL from the display device 180 during display of the image 1000, in response to FIG. 12D.

FIG. 12E illustrates an example in which the size or brightness of the pointer image 201*b* increases, as the intensity of the pointer light PL is greater when compared to FIG. 12C.

Accordingly, the pointer image 201 having variable size can be displayed based on the intensity information of the pointer light PL.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details can be made herein without departing from the subject matter and scope of the present disclosure.

What is claimed is:

1. A display device comprising:
a plurality of light emitting diodes arranged in a matrix form;
a plurality of first switching drivers configured to supply a scan signal or a voltage of a first level to anodes of the plurality of light emitting diodes for each first line based on a switching operation during a display mode period;
a plurality of second switching drivers configured to supply a voltage of a second level less than the first level to cathodes of the plurality of light emitting diodes for each second line based on the switching operation during the display mode period;
a first switch configured to output the scan signal or the voltage of the first level during the display mode period and not output the scan signal or the voltage of the first level during a sensing mode period separate from the display mode period;
a second switch configured to output the voltage of the second level during the display mode period and output a current flowing in at least one of the plurality of light emitting diodes based on a pointer light during the sensing mode period; and
an amplifier configured to amplify a difference between a first line voltage and a second line voltage based on the current flowing in the light emitting diode during the sensing mode period.

2. The display device of claim 1, wherein a current in a first direction flows in at least some of the plurality of light emitting diodes during the display mode period, and a current in a second direction, opposite to the first direction, flows in at least some of the plurality of light emitting diodes during the sensing mode period.

3. The display device of claim 1, wherein in response to a difference between the voltage of the first level and the voltage of the second level, the current in the first direction flows in at least some of the plurality of light emitting diodes during the display mode period and the current in the second direction opposite to the first direction flows in at least some of the plurality of light emitting diodes during the sensing mode period.

4. The display device of claim 1, wherein an anode voltage of the light emitting diode, on which the pointer light is incident, is less in the sensing mode period than in the display mode period, and a cathode voltage of the light emitting diode, on which the pointer light is incident, is greater in the sensing mode period than in the display mode period.

5. The display device of claim 1, further comprising:
a first driver configured to output the scan signal or the voltage of the first level to the plurality of first switching drivers; and
a second driver configured to output the voltage of the second level to the plurality of second switching drivers.

6. The display device of claim 1, further comprising:
a sensing controller configured to control a switching operation of the first switch and the second switch during the sensing mode period; and
a sensing interface configured to supply a signal, output through the amplifier, to a timing controller.

7. The display device of claim 6, wherein the sensing controller is configured to sequentially drive the plurality of first switching drivers and the plurality of second switching drivers during the sensing mode period,
wherein the sensing interface is configured to output coordinate information of the pointer light based on sequential driving of the plurality of first switching drivers and the plurality of second switching drivers.

8. The display device of claim 6, wherein the sensing interface is configured to output intensity information of the pointer light corresponding to a level of the difference between the first line voltage and the second line voltage.

9. The display device of claim 1, wherein the plurality of second switching drivers are configured to output the voltage of the second level during the display mode period, and not output the voltage of the second level during the sensing mode period.

10. The display device of claim 1, wherein the amplifier comprises a multi-stage amplifier,
wherein the display device further comprises a resistor element and a capacitor element connected to an output terminal of the multi-stage amplifier.

11. The display device of claim 10, wherein a resistance value of a resistor element connected to a first stage amplifier of the multi-stage amplifier is preferably larger than a resistance value of a resistor element connected to a second-stage amplifier after the first stage amplifier.

12. The display device of claim 10, wherein the multi-stage amplifier is configured to output a signal with reduced noise by the resistor element and the capacitor element connected to the output terminal of the multi-stage amplifier.

13. The display device of claim 1, further comprising a timing controller configured to control the display mode period and the sensing mode period.

14. The display device of claim 13, wherein the timing controller is configured to perform the sensing mode after performing the display mode.

15. The display device of claim 14, wherein in response to pointing coordinate information corresponding to the pointer light not being detected during the sensing mode period, the timing controller is configured to control the display mode period to be longer than the sensing mode period.

16. The display device of claim 14, wherein in response to the pointing coordinate information corresponding to the pointer light being detected during the sensing mode period, the timing controller is configured to control the display mode period to be equal to or shorter than the sensing mode period.

17. The display device of claim 16, wherein in response to the display mode period being shorter than the sensing mode period, the timing controller is configured to increase a level of the scan signal or the first level or to decrease the second level.

18. An image display apparatus comprising:
a display device; and
a signal processing device configured to output an image signal to the display device,
wherein the display device comprises:
a plurality of light emitting diodes arranged in a matrix form;
a plurality of first switching drivers configured to supply a scan signal or a voltage of a first level to anodes of the plurality of light emitting diodes for each first line based on a switching operation during a display mode period;

a plurality of second switching drivers configured to supply a voltage of a second level less than the first level to cathodes of the plurality of light emitting diodes for each second line based on the switching operation during the display mode period;

a first switch configured to output the scan signal or the voltage of the first level during the display mode period and not output the scan signal or the voltage of the first level during a sensing mode period separate from the display mode period;

a second switch configured to output the voltage of the second level during the display mode period and output a current flowing in at least one of the plurality of light emitting diodes based on a pointer light during the sensing mode period; and an amplifier configured to amplify a difference between a first line voltage and a second line voltage based on the current flowing in the light emitting diode during the sensing mode period.

19. The image display apparatus of claim 18, wherein the signal processing device is configured to output an image signal, including a pointer image, to the display device based on coordinate information of a pointer light from the display device.

20. The image display apparatus of claim 18, wherein the signal processing device is configured to output an image signal including a pointer image, of which size or brightness is changed, to the display device based on intensity information of the pointer light from the display device.

* * * * *